United States Patent
Kadaba et al.

[11] Patent Number: 6,088,649
[45] Date of Patent: *Jul. 11, 2000

[54] METHODS AND APPARATUS FOR SELECTING A DESTINATION IN A VEHICLE NAVIGATION SYSTEM

[75] Inventors: Sudha G. Kadaba, Santa Clara; Naruaki Ishikawa, Sunnyvale, both of Calif.

[73] Assignee: Visteon Technologies, LLC, Dearborn, Mich.

[ * ] Notice: This patent is subject to a terminal disclaimer.

[21] Appl. No.: 09/131,045

[22] Filed: Aug. 5, 1998

[51] Int. Cl.[7] .......................... G06F 17/00; G01C 21/34
[52] U.S. Cl. .......................... 701/201; 701/208; 345/146
[58] Field of Search ..................... 701/200, 208, 701/201; 340/995; 345/146, 352; 707/104

[56] References Cited

U.S. PATENT DOCUMENTS

| | | | |
|---|---|---|---|
| 3,845,289 | 10/1974 | French | 235/151.2 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,218 | 2/1988 | Hasebe et al. | 364/449 |
| 4,734,863 | 3/1988 | Honey et al. | 364/449 |
| 4,751,512 | 6/1988 | Longaker | 342/357 |
| 4,782,447 | 11/1988 | Ueno et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,390 | 8/1989 | Weiner | 395/352 |
| 4,862,398 | 8/1989 | Shimizu et al. | 364/571.05 |
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukrichner et al. | 364/449 |
| 4,989,151 | 1/1991 | Nuimura | 364/449 |
| 4,992,947 | 2/1991 | Nimura et al. | 364/444 |
| 4,996,645 | 2/1991 | Schneyderberg Van DerZon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |

(List continued on next page.)

FOREIGN PATENT DOCUMENTS

| | | |
|---|---|---|
| 0 485 120 A2 | 5/1992 | European Pat. Off. . |
| 0 575 943 1 | 12/1993 | European Pat. Off. . |
| 2 271 423A | 4/1994 | United Kingdom . |

OTHER PUBLICATIONS

French, *MAP matching Origins Approaches and Applications*, Rober L. French & Associates, 3815 Lisbon St., Suite 201, Fort Worth, Texas 76107, USA, pp. 91–116. No Date.

*Primary Examiner*—Michael J. Zanelli
*Attorney, Agent, or Firm*—Beyer Weaver & Thomas, LLP

[57] ABSTRACT

Methods and apparatus are described for selecting an entry from a list of entries in a vehicle navigation system. First and second objects are presented on the system display. The first object includes the list of entries and the second object includes a character slot and a selection window comprising a plurality of adjacent character spaces. The second object is operable to present a sequence of characters in the character slot and to enter one of the characters in each of the character spaces in response to manipulation of an input device associated with the navigation system. An arrangement of the characters is presented in the adjacent character spaces of the selection window and the character slot in response to manipulation of the input device. For each of the characters entered in the selection window, a first entry in the list of entries is highlighted, the first entry corresponding to the arrangement of characters in the selection window and the character slot. A highlighted entry is selected from the list of entries in response to a selection signal generated by actuation of the selection device.

70 Claims, 25 Drawing Sheets

U.S. PATENT DOCUMENTS

| | | | |
|---|---|---|---|
| 5,059,965 | 10/1991 | Geiser | 340/995 |
| 5,060,162 | 10/1991 | Ueyama et al. | 364/449 |
| 5,072,395 | 12/1991 | Bliss et al. | 364/443 |
| 5,115,399 | 5/1992 | Nimura et al. | 364/449 |
| 5,177,685 | 1/1993 | Davis et al. | 364/443 |
| 5,191,532 | 3/1993 | Moroto et al. | 364/449 |
| 5,272,638 | 12/1993 | Martin et al. | 364/444 |
| 5,283,743 | 2/1994 | Odagawa | 364/457 |
| 5,287,297 | 2/1994 | Ihara et al. | 364/571.02 |
| 5,297,050 | 3/1994 | Ichimura et al. | 364/444 |
| 5,297,051 | 3/1994 | Arakawa et al. | 364/449 |
| 5,369,588 | 11/1994 | Hayami et al. | 364/449 |
| 5,371,497 | 12/1994 | Nimura et al. | 340/995 |
| 5,410,485 | 4/1995 | Ichikawa | 364/444 |
| 5,412,573 | 5/1995 | Barnea et al. | 364/449 |
| 5,442,557 | 8/1995 | Kaneko | 364/449 |
| 5,448,485 | 9/1995 | Ishibashi et al. | 364/443 |
| 5,463,554 | 10/1995 | Araki et al. | 364/444 |
| 5,486,822 | 1/1996 | Tenmoku et al. | 340/995 |
| 5,506,774 | 4/1996 | Nobe et al. | 364/424.05 |
| 5,513,110 | 4/1996 | Fujita et al. | 364/449 |
| 5,519,619 | 5/1996 | Seda | 364/444 |
| 5,521,826 | 5/1996 | Matsumoto | 364/449 |
| 5,546,310 | 8/1996 | Ehdaie et al. | 364/449 |
| 5,646,856 | 7/1997 | Kaesser | 364/449.4 |
| 5,654,908 | 8/1997 | Yokoyama | 364/705.05 |
| 5,680,312 | 10/1997 | Oshizawa et al. | 364/444.2 |
| 5,689,252 | 11/1997 | Ayanoglu et al. | 340/991 |
| 5,691,743 | 11/1997 | Kusano | 345/123 |
| 5,712,788 | 1/1998 | Liaw et al. | 364/449 |
| 5,721,684 | 2/1998 | Takita | 364/443 |
| 5,724,316 | 3/1998 | Brunts | 368/10 |
| 5,731,979 | 3/1998 | Yano et al. | 364/449.5 |

METHODS AND APPARATUS FOR SELECTING A DESTINATION IN A VEHICLE NAVIGATION SYSTEM

BACKGROUND OF THE INVENTION

The present invention relates to vehicle navigation systems. More specifically, the present invention provides fast and easy-to-use methods and apparatus for selecting an entry from a list of entries where the list is representative of a large database file. Still more specifically, a graphical user interface for a vehicle navigation system is described herein which facilitates selection of a geographical feature such as, for example, a city, street, highway, or point of interest, for the purpose of route generation.

To enhance the desirability and effectiveness of vehicle navigation systems, user interaction with the such systems must be made convenient and easy to understand. For example, the way in which a user selects a destination for route generation should be self explanatory as well as fast to prevent the user from becoming frustrated. This is especially true in view of the fact that map database files in vehicle navigation systems continue to grow as the geography of more and more regions of the world become more fully digitized. That is, for example, the number of available cities which may be presented to the user in a single list has increased dramatically in recent years. Not only is it tiresome and frustrating to scroll sequentially through the entirety of such a list, it may also present a safety hazard if the driver attempts to select an entry while the vehicle is moving.

In addition, because the display screen represents a significant component of the cost of a vehicle navigation system, smaller (and therefore less expensive) screens are desirable to make the widespread distribution of such systems economically feasible. However, smaller screens impose limits on the number of objects which can be simultaneously presented and therefore on the manner in which a selection algorithm may be implemented. For example, with a 3" screen, only a small number of the entries from a list of cities may be displayed at any given time. In such a case, a page-up/page-down function is typically not sufficient to traverse the list quickly enough to satisfy most users.

As an alternative, an array of alphanumeric characters might be presented from which the user may generate a string of characters which may then be used to jump either directly to or at least closer to an entry corresponding to the string. Unfortunately, for such an array of characters to be sufficiently visible to a user it would need to take up a considerable portion of the display screen, thus taking up space which would otherwise be used to present the list itself. Thus, as the screen size decreases, the practicality of such a solution diminishes. Ultimately, the graphical user interface employed to implement a selection process must strike a balance between the number and size of objects necessary to implement the process such that the objects are clearly visible and the process is sufficiently easy to follow for the typical user.

It is therefore desirable for providers of vehicle navigation systems to provide techniques by which a user may get to a desired entry in a large list without having to traverse all of the entries in the entire database file. It is also desirable that such techniques have simple and visually appealing implementations which may be presented on relatively small display screens.

Another disadvantage of currently available navigation systems is also associated with the manner in which a destination is selected. Specifically, when the user wants to designate the destination by its street address or by a street intersection, the user must typically first identify the city before selecting the street or the address. However, when the user is unfamiliar with the local geography, as is often the case, this may be a difficult task.

It is therefore desirable that the manner in which a destination is selected in a vehicle navigation system be sufficiently flexible to account for the different levels of familiarity among users with the geographic regions in which the system is operating.

SUMMARY OF THE INVENTION

According to the present invention, methods and apparatus for use with a vehicle navigation system are described which facilitate selection of a geographical feature from a list of such features. In a specific embodiment, a graphical user interface (GUI) is provided which may be implemented on a small screen, e.g., 3" diagonal, and which employs clearly visible objects in an elegantly simple selection process. The GUI includes a window in which a portion of the list is presented. When this window is active, the user may scroll sequentially through the entries of the list in a conventional manner using an input device associated with the user interface., According to a specific embodiment, the input device comprises a four-position rocker switch having up, down, left, and right controls.

The GUI also includes a selection window having a programmable number of spaces in which the user may enter a string of alphanumeric characters. In various specific embodiments, there are 8–12 spaces in the selection window. When the selection window first becomes active, a cursor is positioned in the left most space in the window. The user may move through a sequence of available characters at the cursor location, or character slot, by actuation of the up or down controls of the input device. Alternatively, a separate character slot is provided adjacent the selection window in which the sequence of characters is presented. In either case, the user may enter a desired character at the current cursor position by advancing the cursor to the next space in the selection window by actuation of the right control. The user may actuate the left control to go back to a previous space in the selection window. In this way, the user may generate a string of alphanumeric characters in the selection window and the character slot (if provided).

According to a specific embodiment, only a subset of all possible alphanumeric characters are available in the character slot for each position in the selection window. The content of the subset is the set of characters at the corresponding position in the entries in the list which correspond to the current string. So, for example, if the current string is "TR" and the cursor is at the third space in the selection window, the only available character options in the character slot are the third characters in all entries beginning with the string "TR". Such a set is not likely to include, for example, the letters "B", "C", "D", and so on. In this way, the user may quickly traverse the possible characters at a given position in the selection window to enter a desired character.

Each time the string of characters defined by the selection window and the character slot changes, the portion of the list being presented in the list window changes to include and highlight the first entry in the list corresponding to the current string. Alternatively, the list in the list window may be modified or filtered to only include entries corresponding to the current string. In this manner, the user may jump directly to or at least near the desired entry. If the list window is highlighting an entry near the desired entry, the user may activate the list window using a mode key which toggles between the selection window and the list window, and then scroll to the desired entry in a conventional manner using the input device. Once the desired entry is highlighted in the list window the highlighted entry is selected in response to actuation of an enter or selection key by the user. This is true regardless of whether the selection window or list window is currently activated.

The above-described technique may be used to select an entry from a list of any of a variety of geographic feature types. For example, the selected entry may comprise a street name, a city name, a point of interest, a region, or a state.

Thus, the present invention provides methods and apparatus for selecting an entry from a list of entries in a vehicle navigation system. First and second objects are presented on the system display. The first object includes the list of entries and the second object includes character slot and a selection window comprising a plurality of adjacent character spaces. The second object is operable to present a sequence of characters in the character slot and enter one of the characters in each of the character spaces in the selection window in response to manipulation of an input device associated with the navigation system. An arrangement of the characters is presented in the adjacent character spaces of the selection window and the character slot in response to manipulation of the input device. For each of the characters presented in the character slot, a first entry in the list of entries is highlighted, the first entry corresponding to the arrangement of characters in the selection window and the character slot. A highlighted entry is selected from the list of entries in response to a selection signal generated by actuation of the selection device.

The present invention also provides methods and apparatus for selecting a destination using a street address. In response to selection of a street name by a user via the system's user interface, a first city option and an address option are presented to the user via the user interface. Where the first city option is selected by the user, a first list of city names is presented to the user via the user interface. In response to selection of a first city name from the first list by the user, selection of the street address by the user is facilitated via the user interface. In response to selection of the street address by the user, the street address is designated as the destination. Where, however, the address option is selected by the user selection of the street address by the user is facilitated via the user interface. Then, in response to selection of the street address by the user, a second list of city names is presented to the user via the user interface. Finally, in response to selection of the first city name from the second list by the user, the street address is designated as the destination.

A further understanding of the nature and advantages of the present invention may be realized by reference to the remaining portions of the specification and the drawings.

DESCRIPTION OF SPECIFIC EMBODIMENTS

Figure 1:
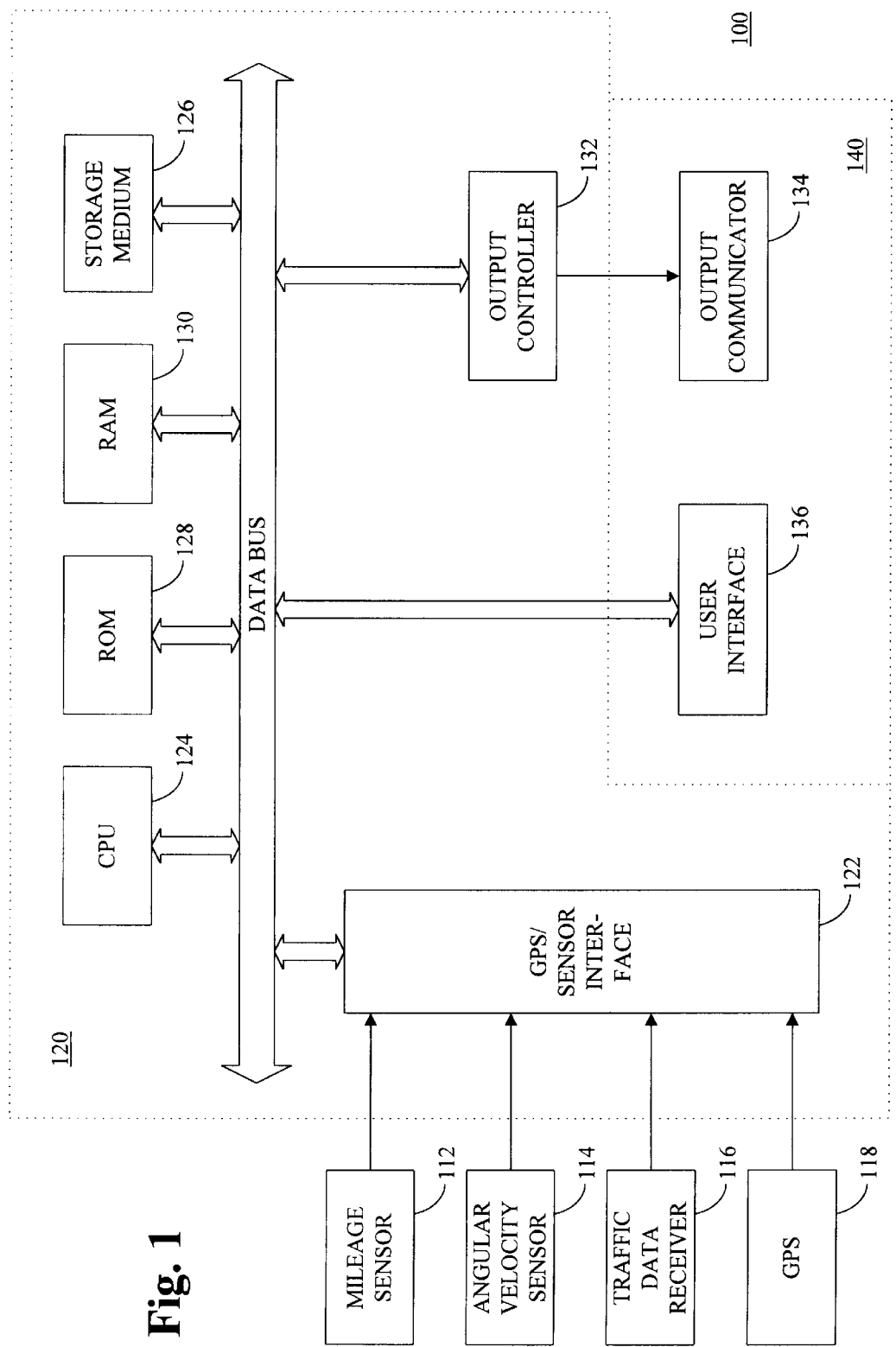
FIG. 1 is a block diagram of a specific embodiment of a vehicle navigation system for use with the present invention.

FIG. 1 is a block diagram of a specific embodiment of a vehicle navigation system 100 for use with the present invention. Sensors 112 and 114, traffic data receiver 116, and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. Traffic data receiver 116 may comprise any of a wide variety of RF receivers which are operable to receive real time traffic data transmitted in a variety of formats. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, and route calculation and guidance functions. A database containing map information may be stored in database medium 126, with software directing the operation of computing means 120 stored in main memory 128 for execution by CPU 124. Memory 128 may comprise any of a wide variety of non-volatile memory such as, for example, read-only memory (ROM), reprogrammable non-volatile memory such as flash memory or SRAM, CD ROM, optical disk, or PCMCIA cards. System RAM 130 permits reading and writing of the information necessary to execute such software programs. Database medium 126 may comprise non-volatile memory, a hard disk drive, CD-ROM, or an integrated circuit in which digitized map information has been stored. Output controller 132, which may comprise a graphics controller, receives data processed by CPU 124 and transmits the data to display console 140 which includes output communicator 134, usually comprising a display screen. The user may input data, such as a desired destination, through user interface 136. User interface 136 may comprise, but is not limited to, a keyboard or a remote control.

The map database stored in database medium 126 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics. such as speed limit and segment length, both of which affect the travel time along the segment. Also associated with each road in the map database is a hierarchy value which relates to the category or type of the road. For example, the highest level category of the hierarchy includes freeways and expressways. The lowest level includes residential streets and/or alleys. The information stored in map database medium 126 is employed with the data received from interface 122 for route calculation and guidance.

Figure 2:
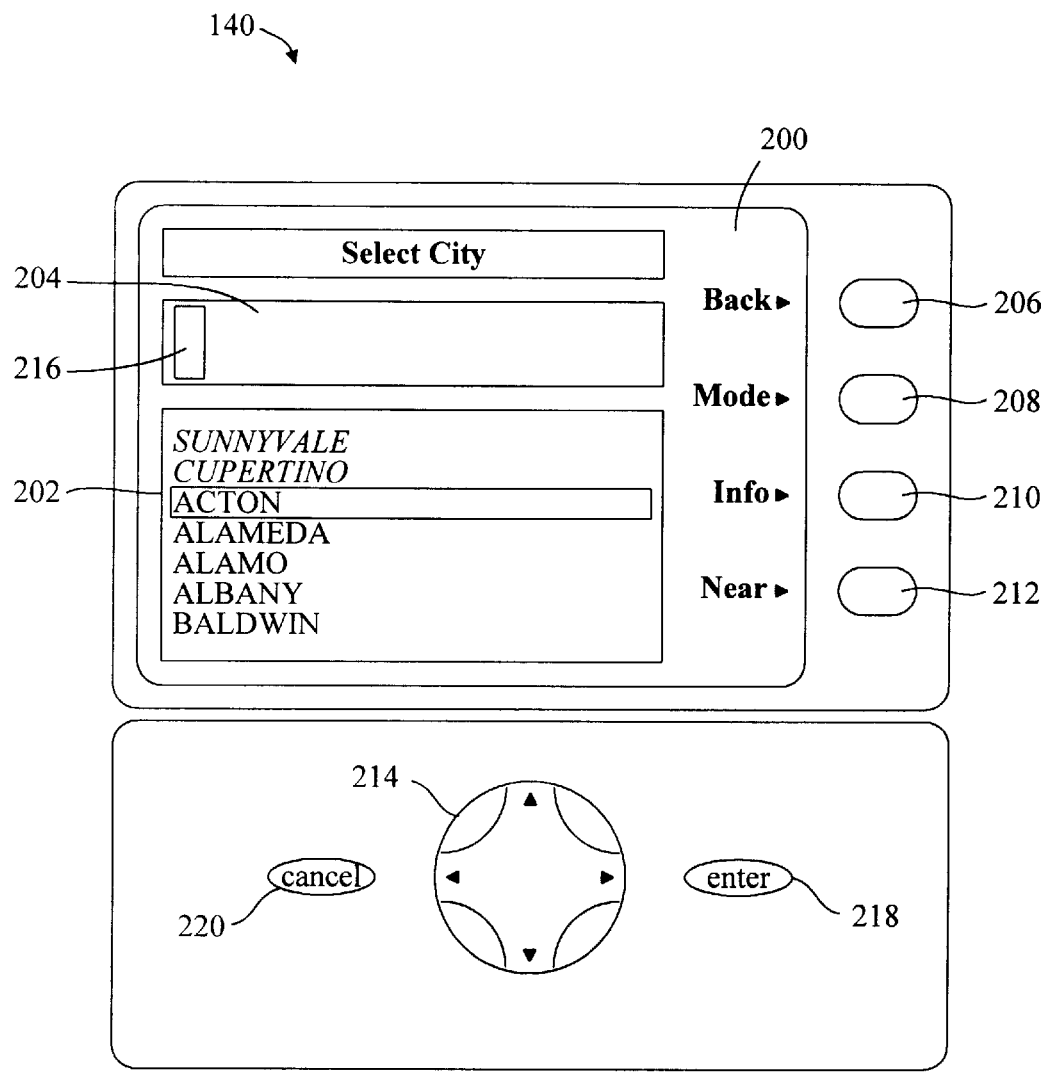
FIG. 2 is a simplified representation of a vehicle navigation system user interface displaying a graphical user interface (GUI) according to a specific embodiment of the invention.

FIG. 2 is a simplified representation of a specific embodiment of display console 140 displaying a "Select City" graphical user interface (GUI) 200 according to a specific embodiment of the invention. GUI 200 includes a city list window 202 which displays a portion of a list of cities corresponding to a city table constructed from data stored in the system's map database. When "Select City" GUI 200 is initially presented, city list window 202 is the active window and shows the first several entries in the city list in alphanumeric order with the first city, in this case "ACTON", highlighted as shown. Also as shown and according to a specific embodiment, window 202 presents the most recently selected cities ("SUNNYVALE" and "CUPERTINO") in italics preceding the list for the convenience of the user. Thus, the user may quickly select what is likely to be the desired destination city without searching through the list. This feature is described in greater detail in commonly assigned, copending U.S. patent application Ser. No. 08/601,216 for METHOD AND APPARATUS FOR SELECTING A DESTINATION IN A VEHICLE NAVIGATION SYSTEM filed on Feb. 14, 1996, the entire specification of which is incorporated herein by reference for all purposes.

GUI 200 also includes a selection window 204 in which, when active, a user may input a string of alphanumeric characters for the purpose of traversing the city list in window 202 and selecting an entry. The process by which this is accomplished will be described in detail with reference to FIGS. 3a–3d and 4. Display console 140 includes soft keys 206–212 the function of each being indicated in GUI 200 as shown. Back key 206 enables the user to go back to the previously displayed screen. Mode key 208 enables the user to switch between city list window 202 and selection window 204. When one is activated in this manner, the other has some attribute which is visually suppressed in some way such as, for example, by suppressing its brightness. Actuation of info key 210 causes information to be displayed regarding a currently highlighted list entry. For example, if a city is highlighted, information about the city such as the county and state is displayed. Finally, actuation of near key 212 causes information to be displayed regarding nearby geographical features of the same category as a currently highlighted list entry. For example, if San Jose is highlighted, nearby cities including Cupertino, Sunnyvale, Santa, Clara, and Milpitas are displayed.

According to a specific embodiment, input device 214 is a four position rocker switch which enables the user to scroll through the city list in window 202 using the up or down positions when window 202 is active. According to some embodiments, the left and right controls of input device 214 allow fast scrolling through the city list when window 202 is active. That is, actuation of the right control causes the displayed list to jump to the first city beginning with the next letter in the alphabet as compared to the currently highlighted selection. Similarly, actuation of the left control causes the list to jump to the first city beginning with the previous letter.

Alternatively, if selection window 204 is active, the up and down controls of input device 214 may be used to step through a sequence of characters at cursor 216. The left and right controls may be used to move cursor 216 to the left and right. The interaction of input device 214, city list window 202, and selection window 204 will be described in greater detail below. Enter key 218 allows the user to select a highlighted entry. Cancel key allows cancellation of a previous keystroke or a current process.

Figure 3A:
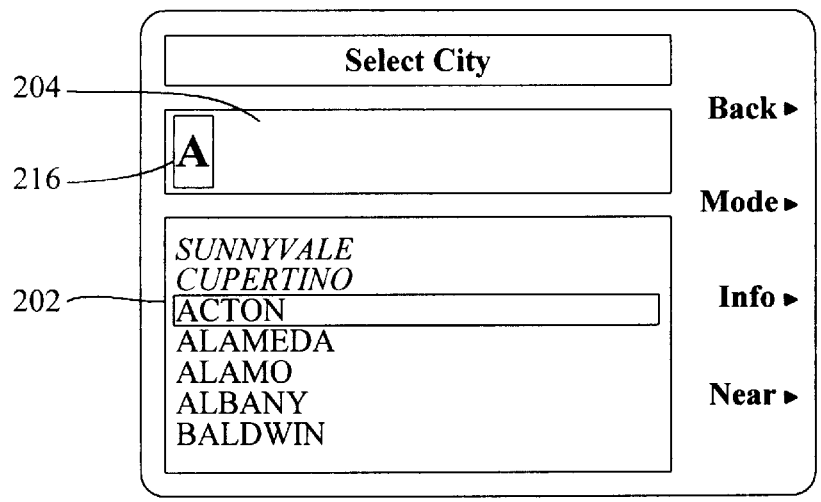
FIGS. 3a–3d are a series of GUI screens illustrating selection of a city according to a specific embodiment of the invention.
Figure 3B:
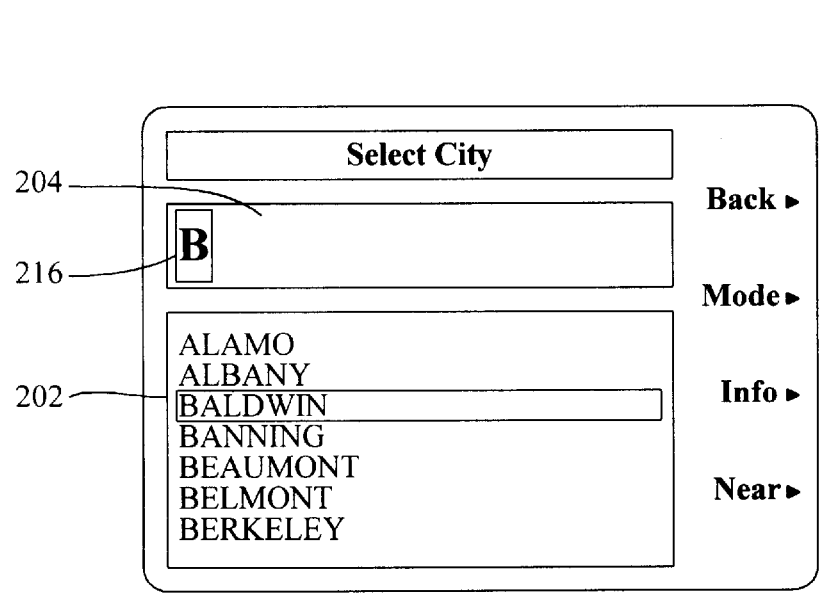
Figure 3C:
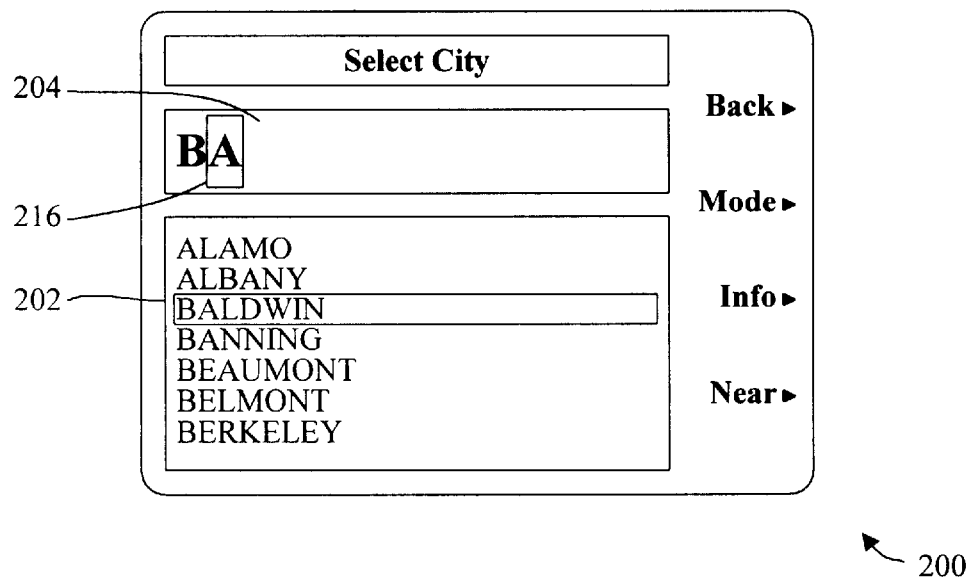
Figure 3D:
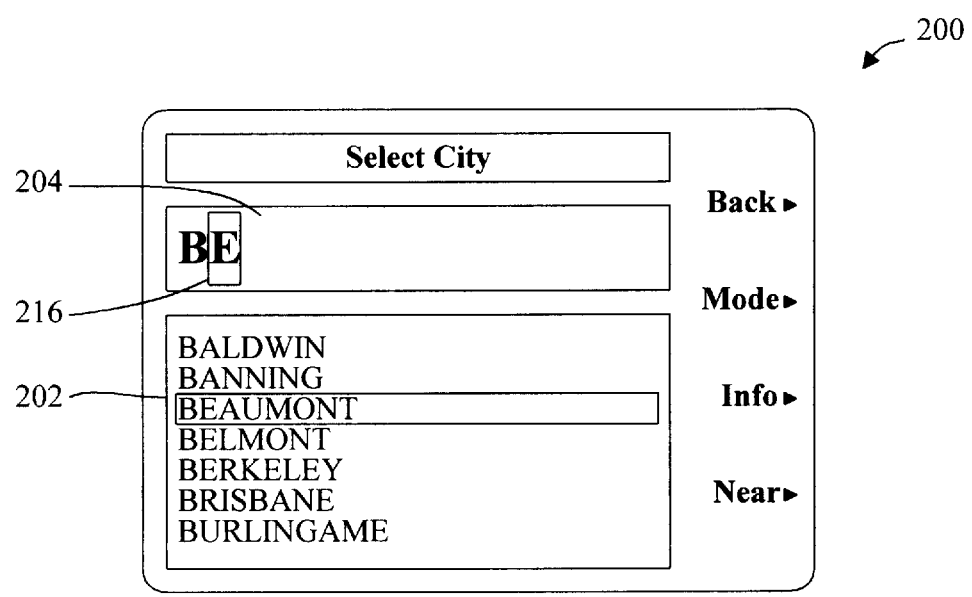
Figure 4:
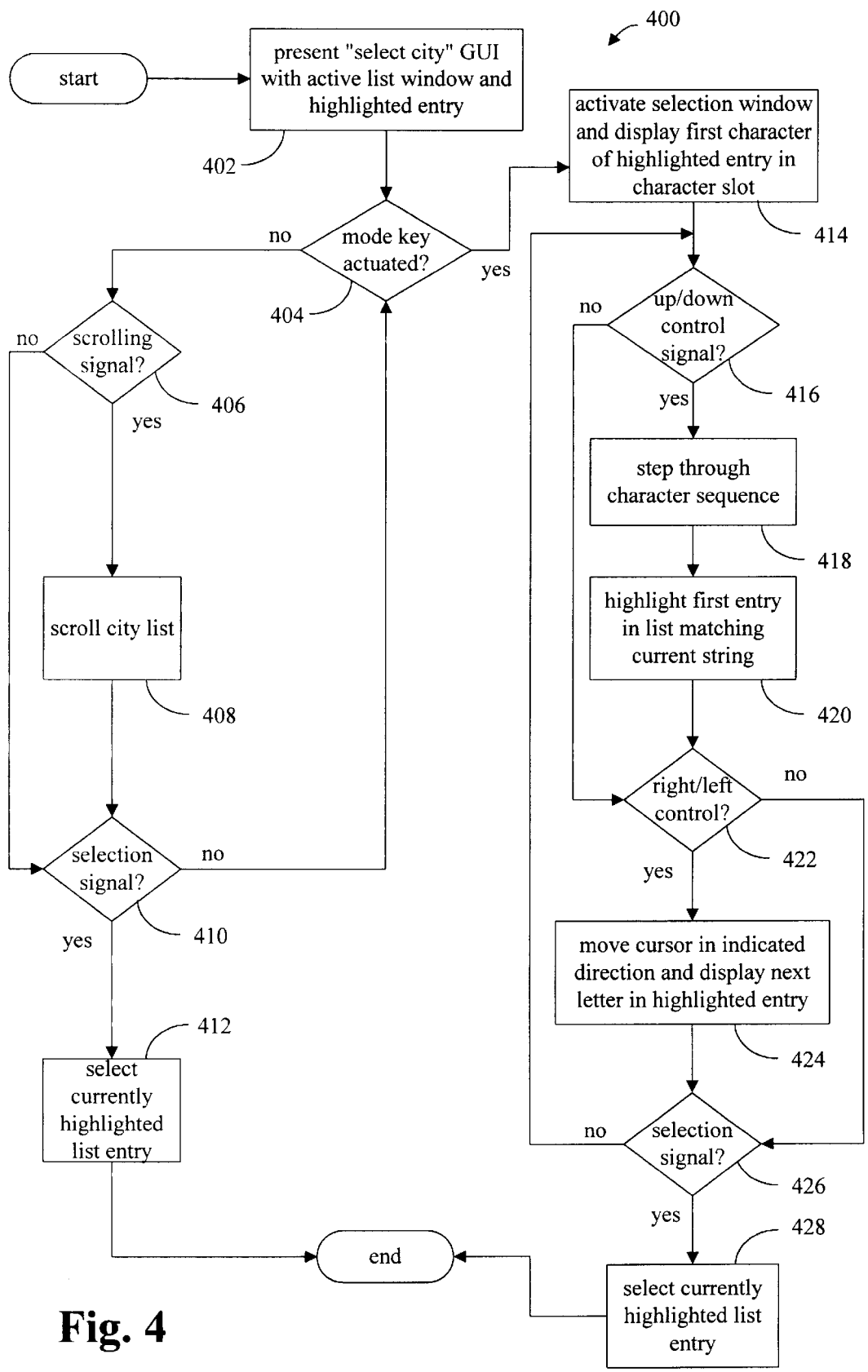
FIG. 4 is a flowchart illustrating a specific embodiment of the present invention.

FIGS. 3a–3d show a series of screens in GUI 200 which serve to illustrate city selection according to a specific embodiment of the invention. FIG. 4 is a flowchart 400 describing the embodiment with reference to FIGS. 2 and 3a–3d. Initially, "Select City" GUI 200 is presented to the user as shown in FIG. 2 in response to the user selecting one of several available options for selecting a destination (402). As mentioned above, city list window 202 is active when GUI 200 is first presented. If the user does not press the mode key to switch to selection window 204 (404), selection of a city in window 202 may proceed in a conventional manner. That is, in response to scrolling signals generated by actuation of the up and down controls of input device 214 (406), the city list scrolls through window 202 (408). And, in response to a selection signal generated by actuation of enter key 218 (410), the currently highlighted selection in city list window 202 is selected (412). It should be noted that actuation of mode key 208 toggles GUI 200 between this conventional selection mode and the selection mode of the invention (described below) at any point in either selection process.

If the user does actuate the mode key (404), selection window 204 becomes active and the first letter in the first entry of the city list appears in the first character space of selection window 204 at cursor 216 (414). Thus, GUI 200 appears as shown in FIG. 3a in which "ACTON" is highlighted in city list window 202 and the letter "A" appears at cursor 216. In response to actuation of the down control of input device 214 (416), the GUI steps through a sequence of characters at cursor 216 (418). As each character appears at cursor 216, city list window 202 jumps to the first entry matching the current string in selection window 202 (420). Thus, after a single actuation of the down control, GUI 200 appears as shown in FIG. 3b in which the letter "B" appears at cursor 216 and the first entry in the city list beginning with "B", i.e., "BALDWIN", is highlighted. As shown in FIGS. 3a and 3b, the characters in selection window 204 are more easily read than those in window 202 because they are presented in a larger font. According to other embodiments, the characters in selection window 204 are differentiated from those in window 202 by other attributes such as, for example, brightness, color, etc. It should also be noted that, even though selection window 204 is active, the city list in window 202 continues to respond to the current character string in selection window 204. That is, even though "inactive" window 202 continues to jump to the first entry in the city list corresponding to the character string in window 204.

In response to actuation of the right or left control of input device 214 (422), cursor 216 moves in the indicated direction (424) and the letter at the corresponding position in the currently highlighted selection appears at the new location of cursor 216. Thus, because "BALDWIN" is currently highlighted in FIG. 3b, a single actuation of the right control from this screen results in cursor 216 moving one space to the right and the appearance of the letter "A" at the cursor as shown in FIG. 3a. The up/down controls of input device 214 may then be used as described above to step through the available characters in the second position of entries beginning with the letter "B". Thus, a single actuation of the down control results in the appearance of the letter "E" at cursor 216 and the highlighting of the entry "BEAUMONT" in window 202 as shown in FIG. 3d. The letters "B", "C", and "D" are skipped in the sequence at this cursor position because no entries correspond to the strings "BB", "BC", or "BD". In general, characters which do not occur at a given position in any of the list entries corresponding to the current character string will not appear in the sequence at the corresponding position in selection window 204.

Finally, in response to a selection signal generated by actuation of enter key 218 (426), the currently highlighted selection in city list window 202 is selected (428). This is true regardless of which of windows 202 and 204 is active. That is, the user is not required to hit mode key 208 to activate window 202 before indicating the selection with enter key 218. As discussed above, however, the user may switch back to list window 202 at any time if, for example, the desired entry is close to the currently highlighted entry in window 202 and the user wants to complete the traverse of the list using conventional scrolling.

FIGS. 5a–5d show a series of screens in GUI 500 which serve to illustrate city selection according to another specific embodiment of the invention. Like GUI 200, GUI 500 has a city list window 502 which displays a portion of a list of cities corresponding to a city table constructed from data stored in the system's map database. In addition, like GUI 200, when GUI 500 is initially presented, city list window 502 is the active window and shows the first several entries in the city list in alphanumeric order with the first city highlighted. However, instead of a single selection window, GUI 500 has a selection window 504 and a character slot 505 which together perform a function similar to that described above with reference to selection window 204. The difference is that stepping through the sequence of characters with input device 214 occurs in character slot 505 rather than at cursor 516. Other than that, the selection process proceeds in the manner described above with reference to FIGS. 2, 3a–3d, and 4.

Figure 5A:
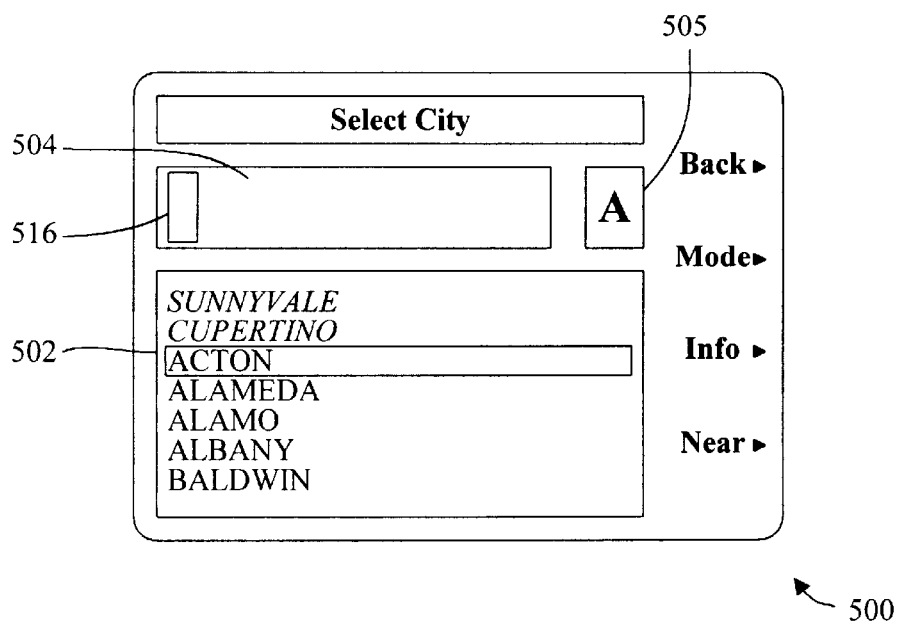
FIGS. 5a–5d are a series of GUI screens illustrating selection of a city according to another specific embodiment of the invention.
Figure 5B:
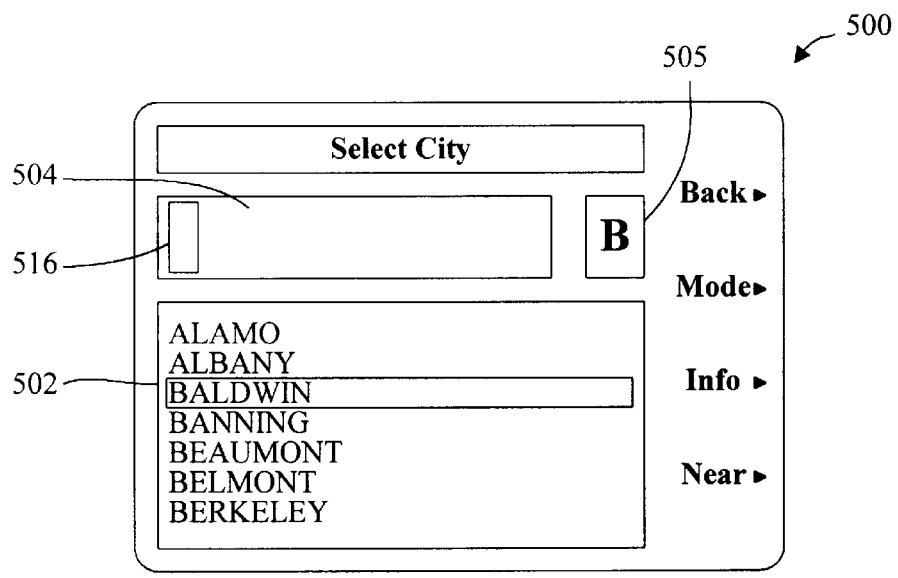

Thus, once the mode key is pressed to activate selection window 504 and character slot 505, GUI 500 appears as shown in FIG. 5a in which "ACTON" is highlighted in city list window 502 and the letter "A" appears in character slot 505. In response to actuation of the down control of input device 214 (416), the GUI steps through a sequence of characters in character slot 505 (418). As each character appears in character slot 505, city list window 502 jumps to the first entry matching the combined string in selection window 504 and character slot 505 (420). Thus, after a single actuation of the down control, GUI 500 appears as shown in FIG. 5b in which the letter "B" appears in character slot 505 and the first entry in the city list beginning with "B", i.e., "BALDWIN", is highlighted in window 502. As shown in FIGS. 5a and 5b, and as described above with reference to FIGS. 3a–3d, the characters in selection window 504 and character slot 505 are more easily read than those in window 502 because they are presented in a larger font. According to other embodiments, the characters in selection window 504 and character slot 505 are differentiated from those in window 502 by other attributes such as, for example, brightness, color, etc. It should also be noted that, even though selection window 504 and character slot 505 are active, the city list in window 502 continues to respond to the combined character string in selection window 504 and character slot 505. That is, even though "inactive", city list window 502 continues to jump to the first entry in the city list corresponding to the current character string.

Figure 5C:
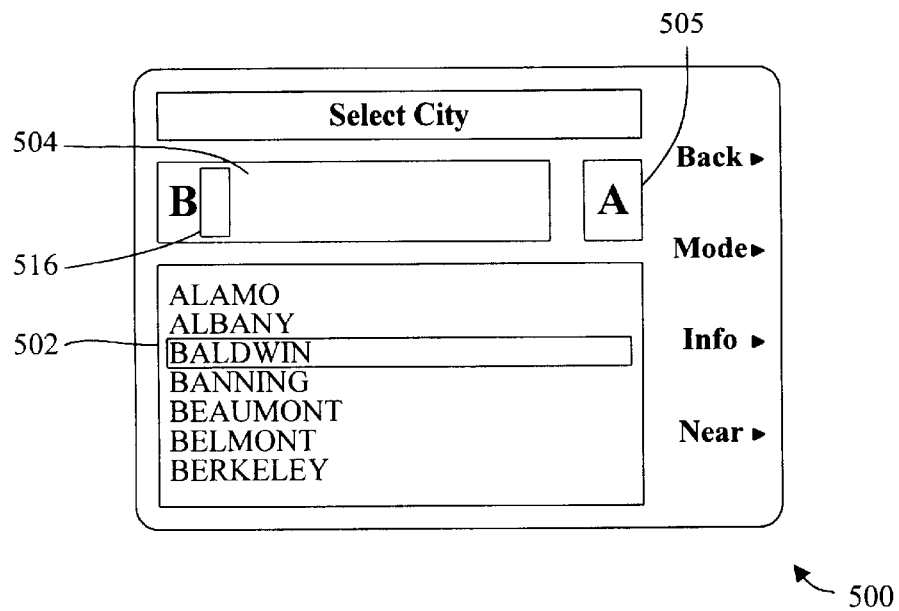
Figure 5D:
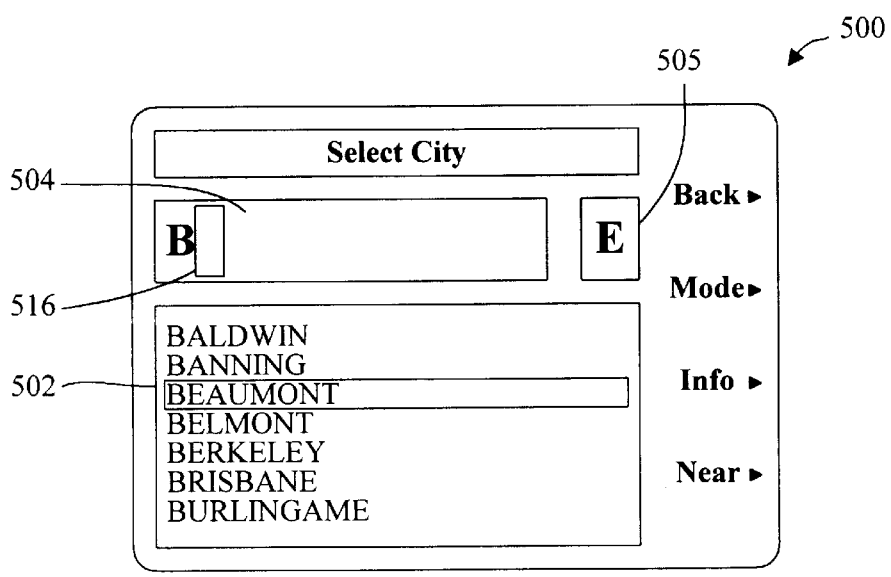

In response to actuation of the right or left control of input device 214 (422), cursor 516 moves in the indicated direction (424) and the letter at the corresponding position in the currently highlighted selection appears in character slot 505. Thus, because "BALDWIN" is currently highlighted in FIG. 5b, a single actuation of the right control from this screen results in cursor 516 moving one space to the right and the appearance of the letter "A" in character slot 505 as shown in FIG. 5c. The up/down controls of input device 214 may then be used as described above to step through the available characters in the second position of entries beginning with the letter "B". Thus, a single actuation of the down control results in the appearance of the letter "E" in character slot 505 and the highlighting of the entry "BEAUMONT" in window 502 as shown in FIG. 5d. As discussed above, the letters "B", "C", and "D" are skipped in the sequence corresponding to this cursor position because no entries in the city list correspond to the strings "BB", "BC", or "BD". In general, characters which do not occur at a given position in any of the list entries corresponding to the current character string will not appear in the sequence in character slot 505 for the corresponding position in selection window 504.

FIGS. 6a–6d show a series of screens in GUI 600 which serve to illustrate city selection according to yet another specific embodiment of the invention. Like GUI 200, GUI 600 has a city list window 602 which displays a portion of a list of cities corresponding to a city table constructed from data stored in the system's map database. In addition, like GUI 200, when GUI 600 is initially presented, city list window 602 shows the first several entries in the city list in alphanumeric order with the first city highlighted. However, GUI 600 does not have a separate selection window or character slot 505 to perform the selection function described above with reference to FIGS. 3a–3d or 5a–5d. Instead, according to this embodiment, stepping through the sequence of characters with input device 214 occurs in the entries of city list window 602 themselves.

Figure 6A:
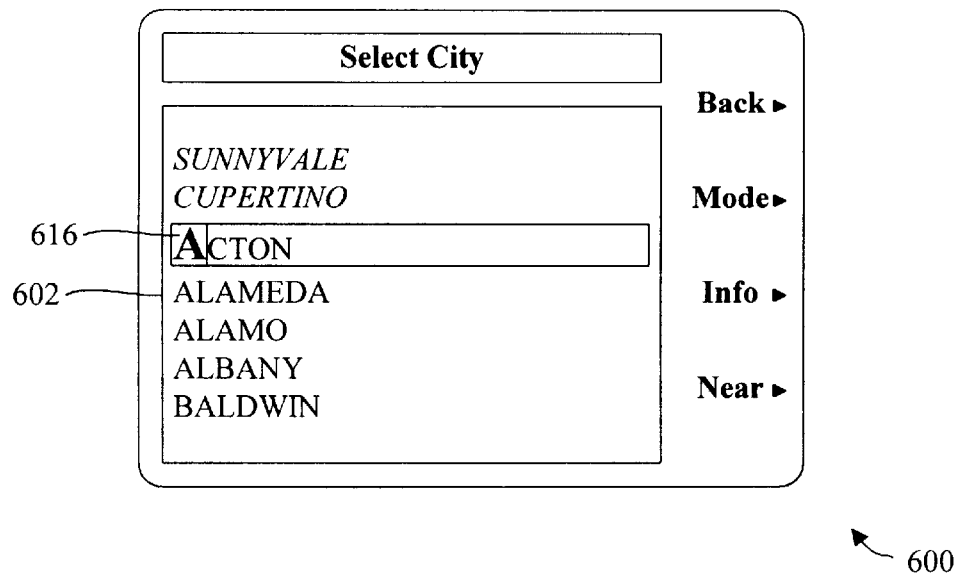
FIGS. 6a–6d are a series of GUI screens illustrating selection of a city according to yet another specific embodiment of the invention.
Figure 6B:
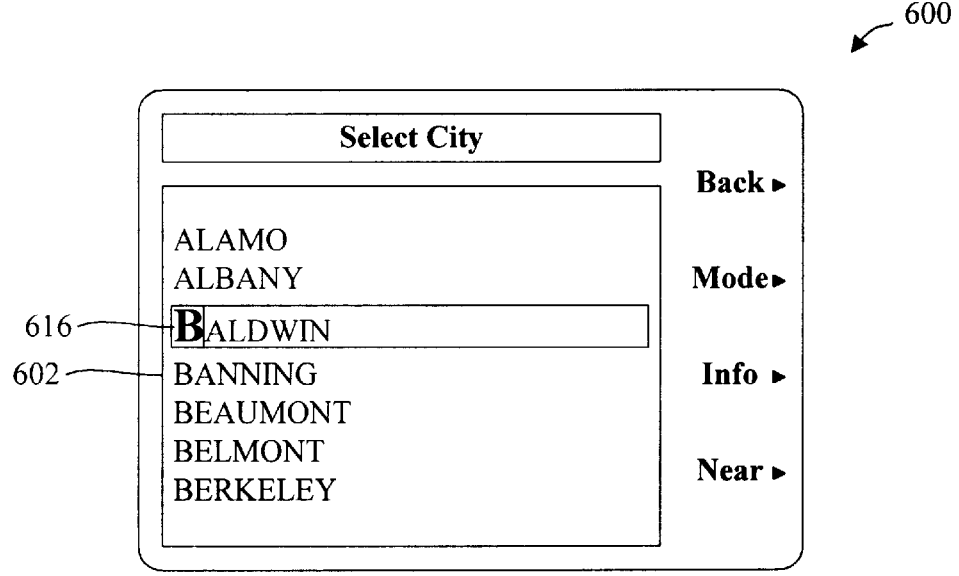

Thus, GUI 600 appears as shown in FIG. 6a in which "ACTON" is highlighted in city list window 602 and the first letter, i.e., "A", is set off by cursor 616 and appears larger than the other characters in the entry. In response to actuation of the down control of input device 214, the GUI steps through a sequence of characters at cursor 616. As each character appears at cursor 616, city list window 602 jumps to the first entry matching the character at cursor 616. Thus, after a single actuation of the down control, GUI 600 appears as shown in FIG. 6b in which the letter "B" appears at cursor 616 and the first entry in the city list beginning with "B", i.e., "BALDWIN", is highlighted. As shown in FIGS. 6a and 6b, and as described above, the character at cursor 616 is more easily read than the other characters in window 602 because they are presented in a larger font. According to other embodiments, the character at cursor 616 is differentiated from the others in window 502 by other attributes such as, for example, brightness, color, etc.

Figure 6C:
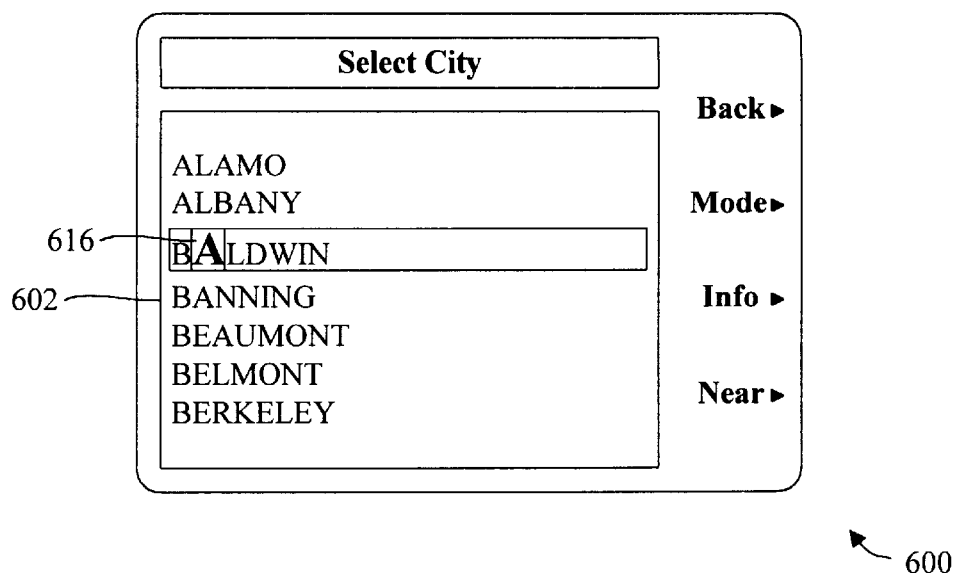
Figure 6D:
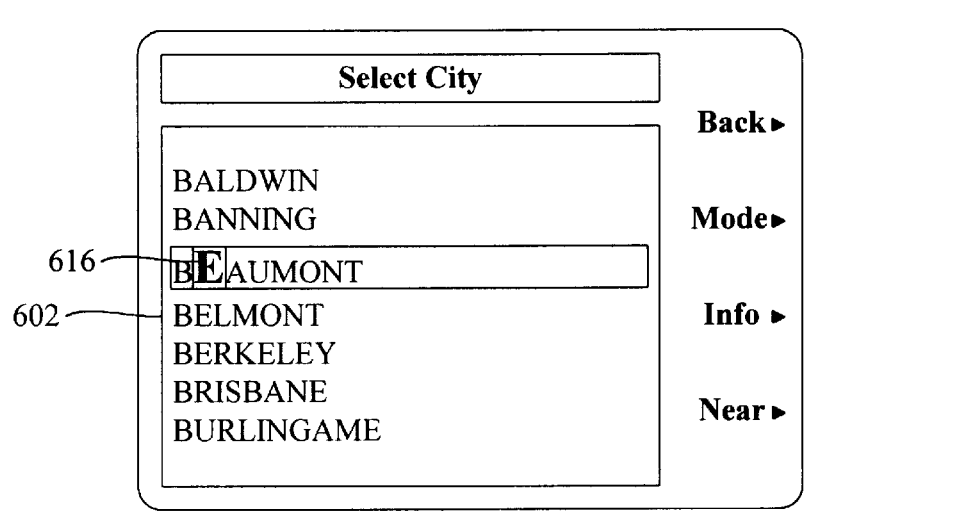

In response to actuation of the right or left control of input device 214, cursor 616 moves in the indicated direction and the letter at the new cursor position in the currently highlighted selection becomes enlarged while the previously highlighted character resumes its normal size. Thus, because "BALDWIN" is currently highlighted in FIG. 6b, a single actuation of the right control from this screen results in cursor 616 moving one space to the right and the appearance of the enlarged letter "A" at cursor 616 as shown in FIG. 6c. The up/down controls of input device 214 may then be used to step through the available characters in the second position of entries beginning with the letter "B". Thus, a single actuation of the down control results in the appearance of the letter "E" at cursor 616 and the highlighting of the entry "BEAUMONT" as shown in FIG. 6d. As discussed above, the letters "B", "C", and "D" are skipped in the sequence corresponding to this cursor position because no entries in the city list correspond to the strings "BB", "BC", or "BD". In general, characters which do not occur at a given position in any of the list entries corresponding to the current character string will not appear in the sequence at cursor 616 for that position.

Figure 7A:
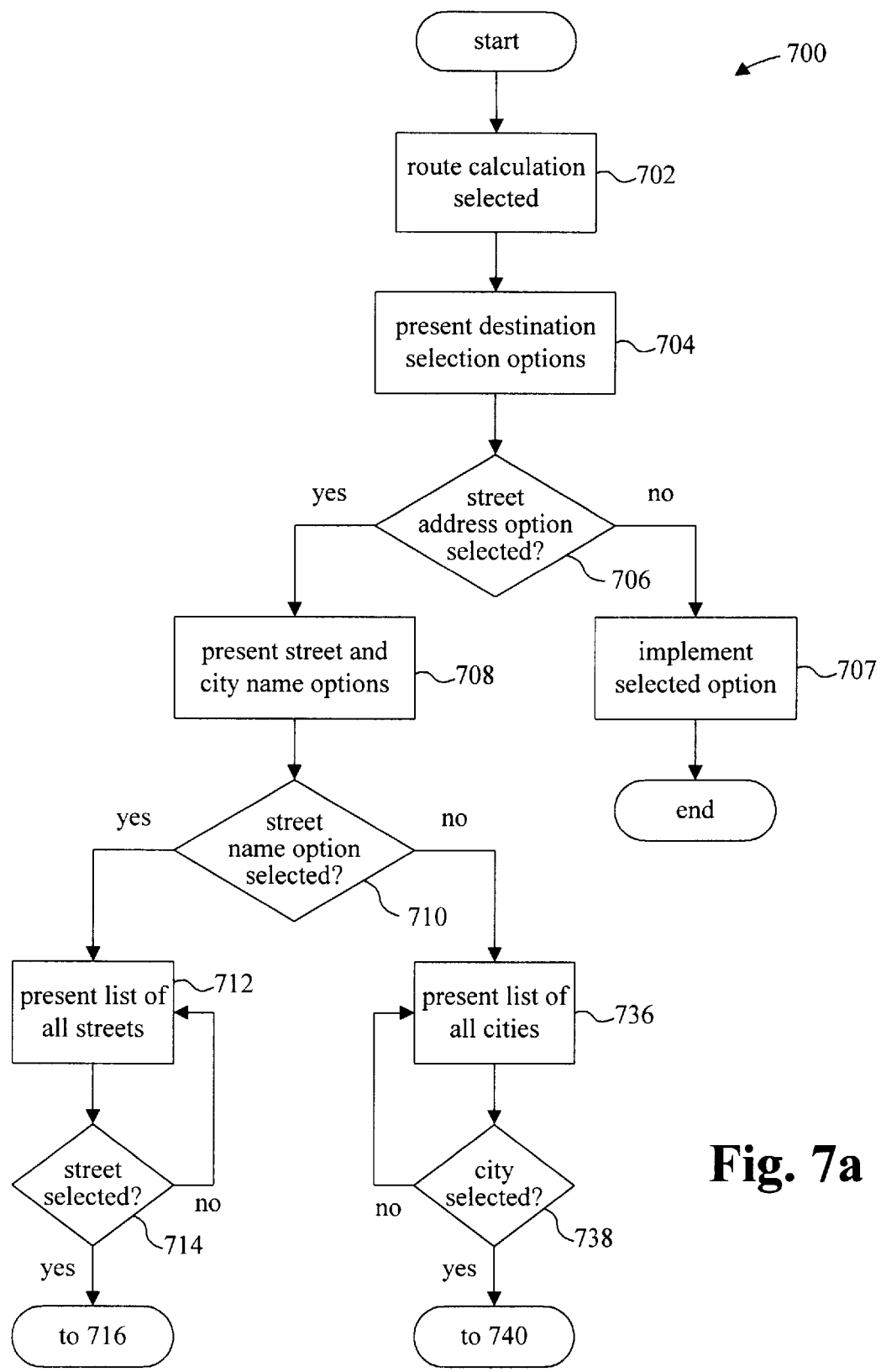
FIGS. 7a and 7b is a flowchart illustrating another specific embodiment of the invention.
Figure 7B:
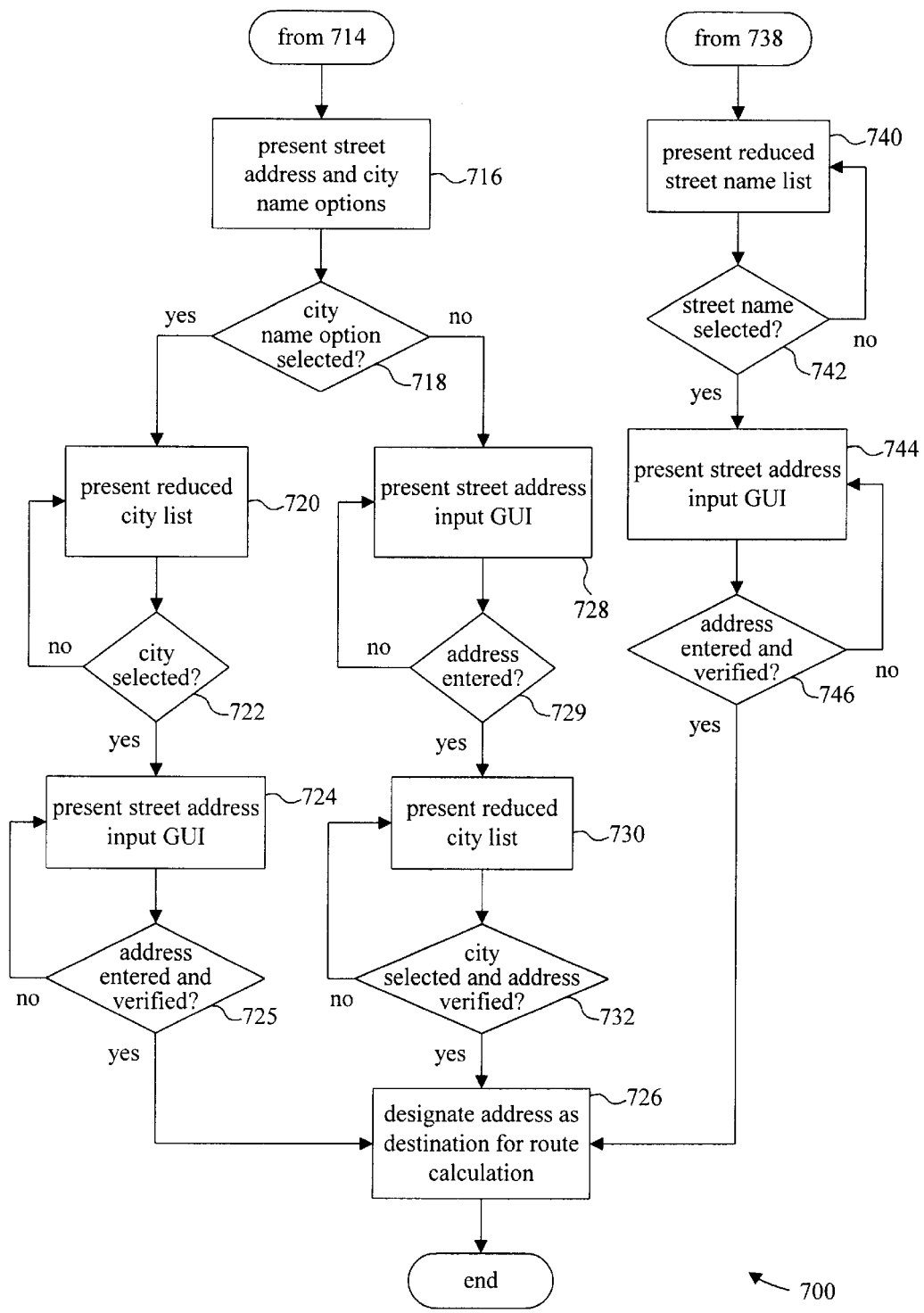

A specific embodiment of the invention will now be described with reference to flowchart 700 of FIGS. 7a and 7b and the graphical user interface (GUI) screens 802–818 of FIGS. 8a–8i. In response to the user selecting route calculation (702), the system presents GUI 802 which offers the user a variety of options for selecting the destination (704). That is, the user may select a destination by designating a street address, the intersection of two streets, or a point of interest such as, for example, a museum or ball park. The street address option is the option of interest here and is described below.

In response to selection of the street address option in GUI 802 (706), the system presents GUI 804 (708) which offers the user the option of beginning the designation of the street address with either the street name or the city. If, on the other hand, either of the other two destination selection options in GUI 802 is chosen that option is implemented according to any of a variety of techniques (707). Referring again to GUI 804, having the option of beginning with the street name is particularly useful for someone who is unfamiliar with the local geography and, as may often be the case, only knows the street address itself. Upon selection of the street name option in GUI 804 (710), the system presents in GUI 806 a list of all of the streets in the system's map database (712). Selection of a particular entry from the list in GUI 806 (or any other list GUI presented in this embodiment) may be effected according to any of the selection techniques described herein or by any of a variety of conventional techniques. Thus, the scope of the invention is not confined to the "look and feel" of GUI 806 (or the other list GUIs) which is used for the purpose of illustration.

Upon selection of a particular street name in GUI 806 (714), the system presents GUI 808 (716) which presents the user with the option of inputting the address or identifying the city. As will be discussed below with reference to FIG. 9, identification of the city at this point in the selection process is less problematic because only cities in which the selected street name exists will be presented to the user, thus allowing the user to more easily eliminate obviously inappropriate choices.

Where the user chooses to identify the city (718), the system presents a list of cities in GUI 810 (720) which, as mentioned above, includes only cities which have a street corresponding to the street name selected in GUI 806. Because the number of cities having a particular street name is likely to be much smaller than the number of cities represented in the map database, the user can more easily identify the correct choice via process of elimination. For example, if only two options, Los Angeles and San Francisco, are presented and the user knows that the street is not in Southern California, San Francisco is identified as the obvious choice. When the user has selected the city (722), the system presents GUI 812 (724) which allows the user to input the street address. Once the address has been entered and verified (725), the system designates it as the destination and begins route calculation (726).

Figure 8A:
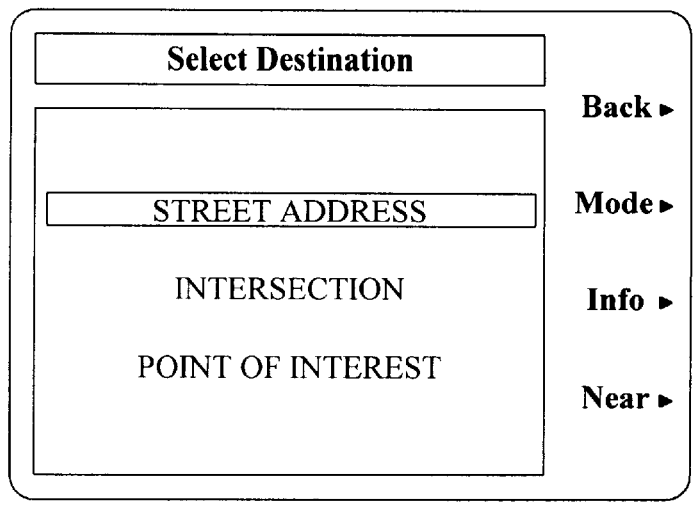
FIGS. 8a–8i are a series of GUI screens illustrating selection of a destination for route calculation according to a specific embodiment of the invention.
Figure 8B:
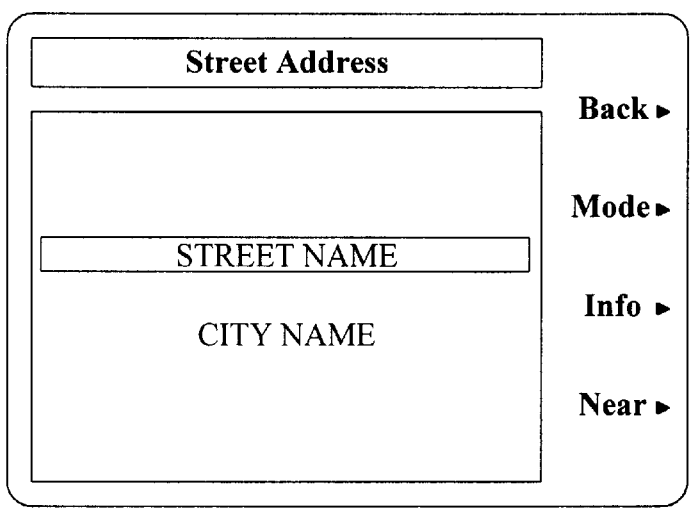
Figure 8C:
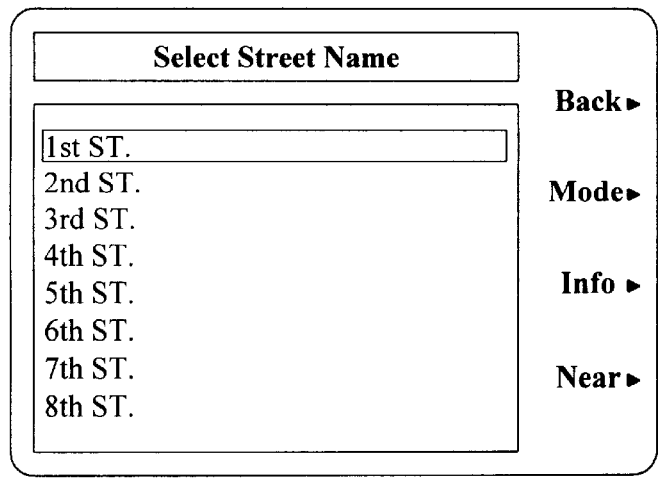
Figure 8D:
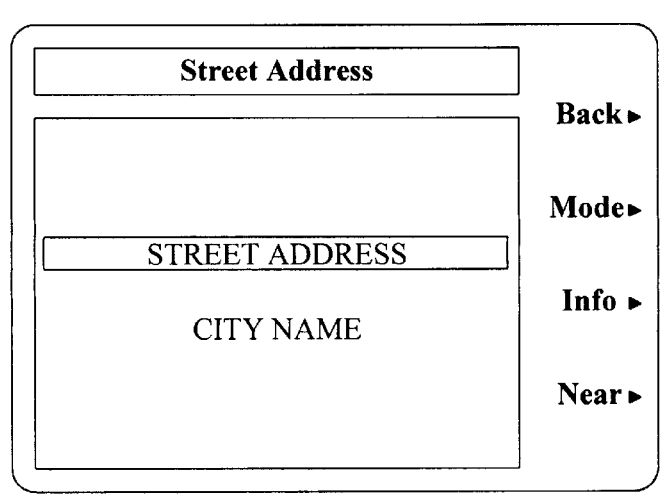
Figure 8E:
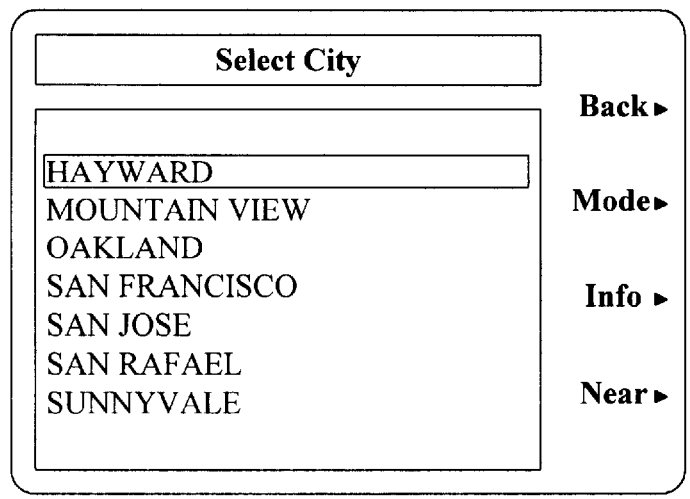
Figure 8F:
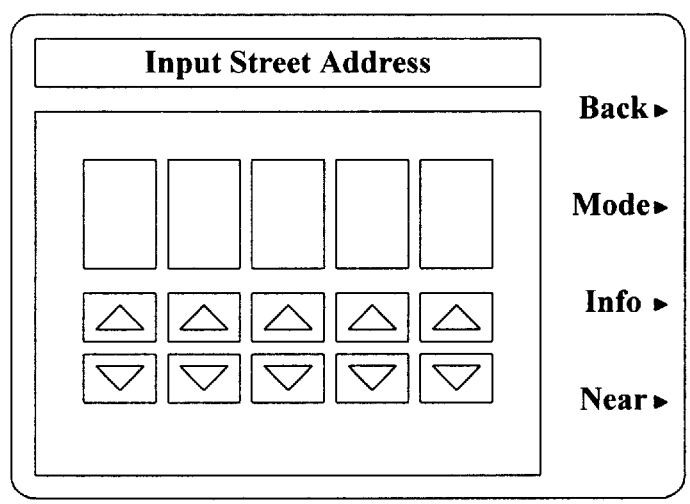
Figure 8G:
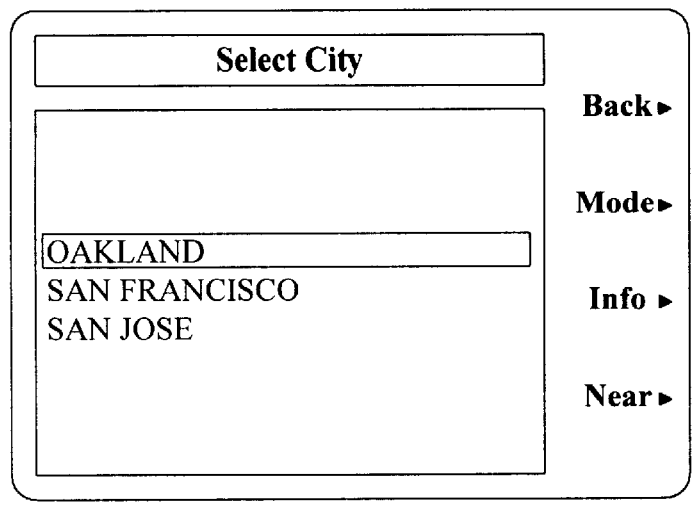
Figure 8H:
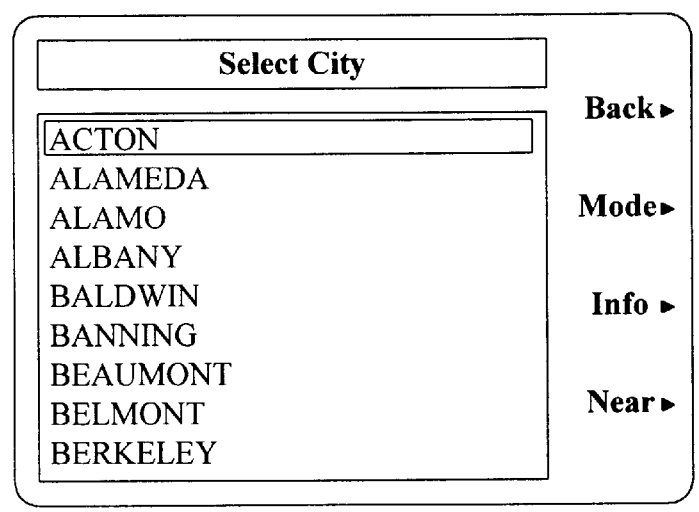
Figure 8I:
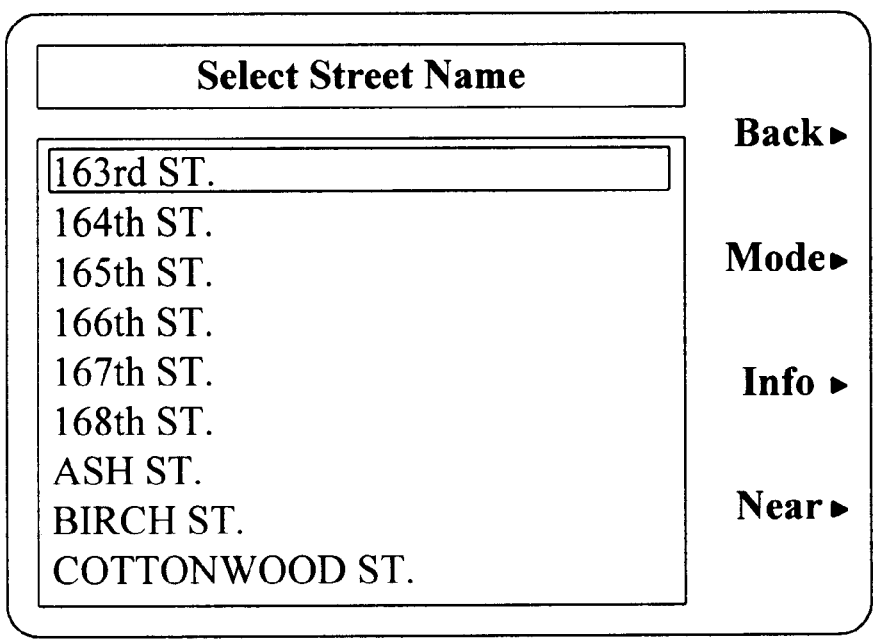

If on the other hand, in GUI 808 the user elects to enter the street address before designation of the city, the system presents GUI 812 (728). Then, when the user has entered the street address (729), the system presents a list of cities in GUI 814 (730). According to a specific embodiment (not shown), the city list in GUI 814 is the same as that displayed in GUI 810. That is, it only contains cities having the selected street. According to another embodiment, and as shown in FIG. 8g, the city list in GUI 814 is further restricted to only include cities having the selected street and which have an address range including the entered address. Upon selection of the city and verification of the street address (732), the system designates the street address as the destination and begins route calculation (726).

If at GUI 804, the user knows which city the address is in and elects to begin the selection process by designating the city rather than the street (710), the system presents a city list in GUI 816 which includes all of the cities covered by the map database (736). In response to selection of a city (738), the system presents a list of street names in GUI 818 which correspond to the selected city (740). That is, only street names corresponding to streets in the selected city are presented. In response to selection of a street name in GUI 818 (742), the system presents GUI 812 to facilitate inputting of the street address (744). Once the street address is entered and verified (746), the system designates the street address as the destination and begins route calculation (726).

It will be understood that various ones of the GUIs of FIGS. 8a–8i may incorporate the features of and operate as described above with reference to FIGS. 2–6d. For example, GUIs 806, 810, 814, 816, and 818 may employ the scrolling techniques described above to select an entry from the displayed list.

Figure 9:
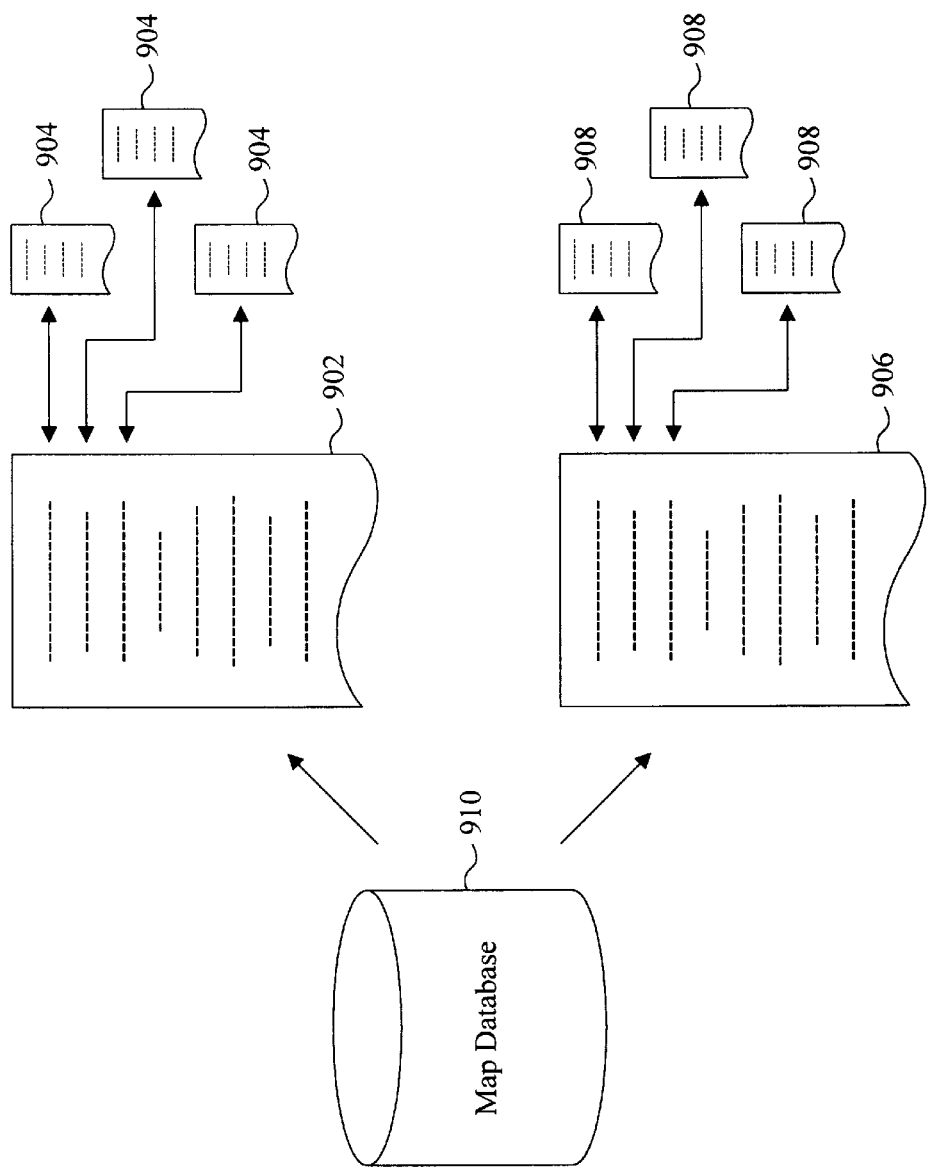
FIG. 9 illustrates the relationship between data tables in the memory of the vehicle navigation system of the present invention.

FIG. 9 shows data tables 902–908 in system memory which are derived from the data in map database 910. Data tables 902–908 correspond to various ones of the GUI screens of FIGS. 8a–8i. For example, data table 902 corresponds to the city list presented in GUI 816. That is, data table 902 contains entries for all of the cities covered by map database 910. In addition, for each entry in data table 902 there is a corresponding street name data table 904 which contains entries for streets in the corresponding city. The street name list in GUI 818 corresponds to one of street name data tables 904.

There is also a street name table 906 in system memory which contains entries for all streets represented in database 910. Data table 906 corresponds to the street name list presented in GUI 806. For each entry in data table 906 there is a corresponding data table 908 which contains entries for cities which have streets corresponding to the street name. The city list in GUI 810 corresponds to one of city tables 908. As discussed above, address range information for a particular entry in data table 906 may be used to further reduce the number of entries in the corresponding city table 908 as discussed with reference to GUI 814.

Figure 10A:
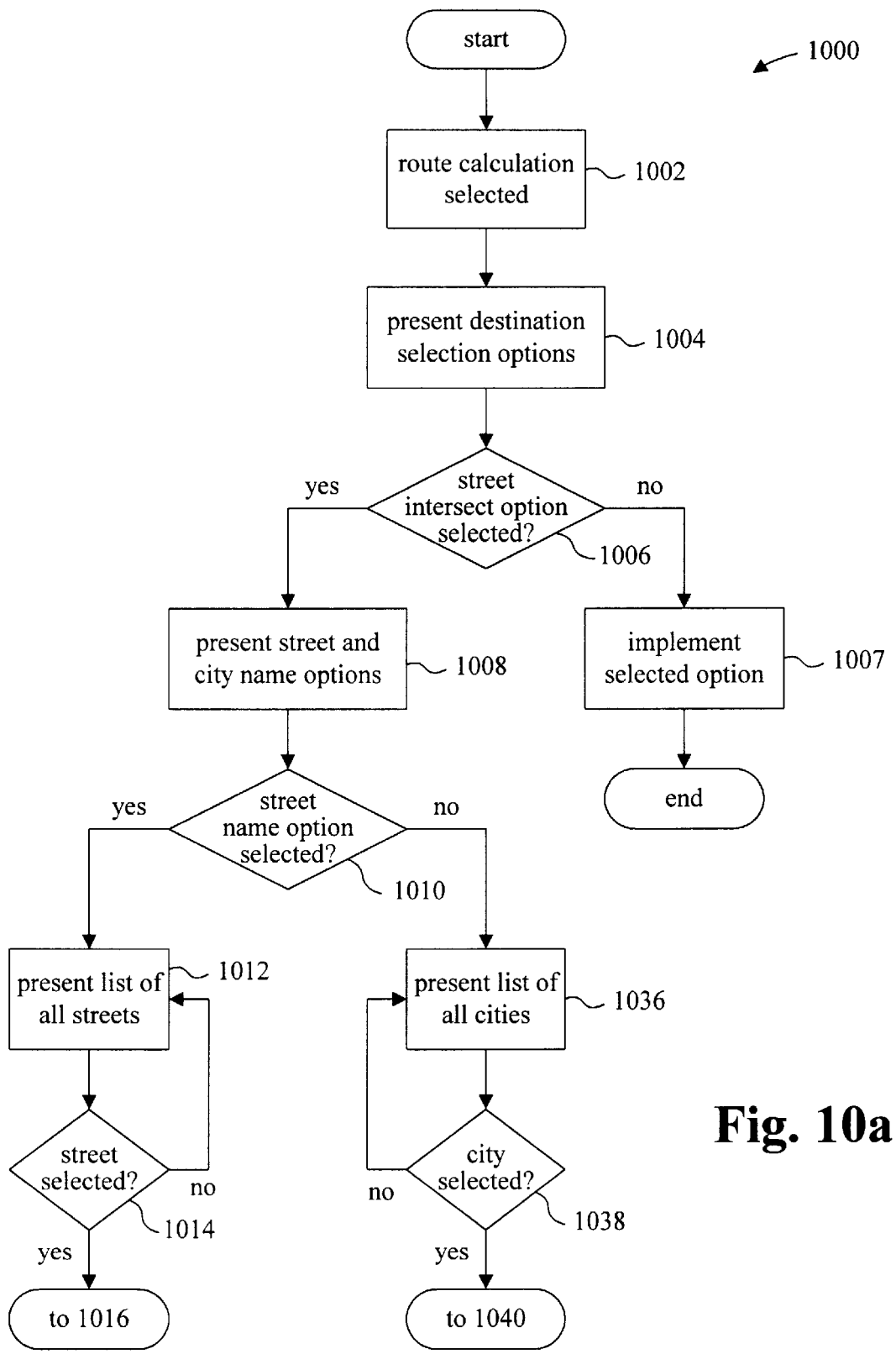
FIGS. 10a and 10b is a flowchart illustrating yet another specific embodiment of the invention.
Figure 10B:
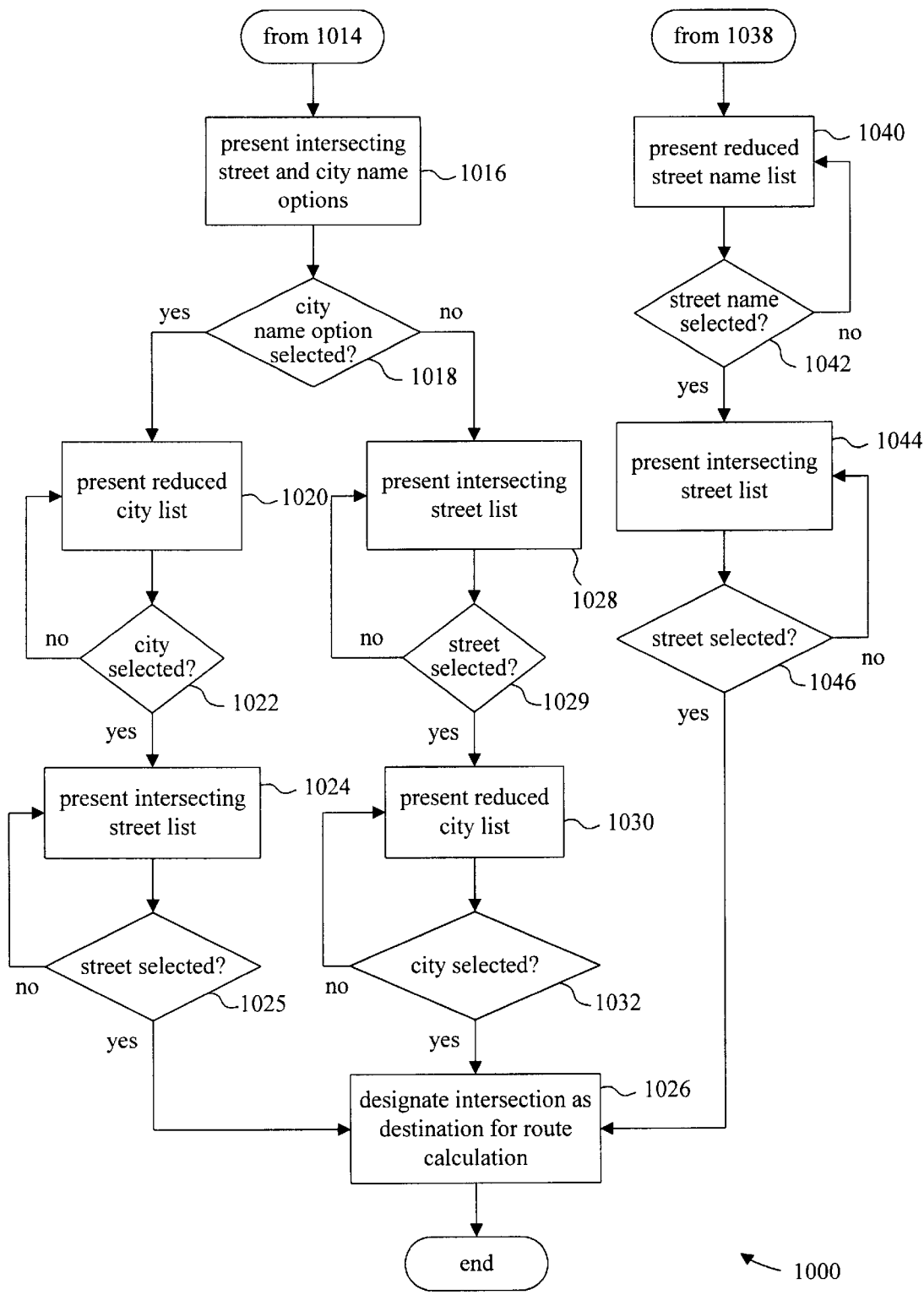

Another specific embodiment of the invention will now be described with reference to flowchart 1000 of FIGS. 10a and 10b and the graphical user interface (GUI) screens 1102–1118 of FIGS. 11a–11j. According to this embodiment, a destination is selected by specification of a street intersection. In response to the user selecting route calculation (1002), the system presents GUI 1102 which offers the user a variety of options for selecting the destination (1004). That is, the user may select a destination by designating a street address, the intersection of two streets, or a point of interest such as, for example, a museum or ball park. The street intersection option is the option of interest here and is described below.

In response to selection of the street intersection option in GUI 1102 (1006), the system presents GUI 1104 (1008) which offers the user the option of beginning the designation of the intersection with either a street name or the city. If, on the other hand, either of the other two destination selection options in GUI 1102 is chosen that option is implemented according to any of a variety of techniques (1007) including, for example, the technique described above with reference to FIGS. 7–9. Referring again to GUI 1104, having the option of beginning with a street name is particularly useful for someone who is unfamiliar with the local geography and, as may often be the case, only knows the names of the intersecting streets. Upon selection of the street name option in GUI 1104 (1010), the system presents in GUI 1106 a list of all of the streets in the system's map database (1012). Selection of a particular entry from the list in GUI 1106 (or any other list GUI presented in this embodiment) may be effected according to any of the selection techniques described herein or by any of a variety of conventional techniques. Thus, the scope of the invention is not confined to the "look and feel" of GUI 1106 (or the other list GUIs) which is used for the purpose of illustration.

Upon selection of a particular street name in GUI 1106 (1014), the system presents GUI 1108 (1016) which presents the user with the option of identifying the intersecting street or identifying the city. As will be discussed below with reference to FIG. 12, identification of the city at this point in the selection process is less problematic because only cities in which the selected street name exists will be presented to the user, thus allowing the user to more easily eliminate obviously inappropriate choices.

Where the user chooses to identify the city (1018), the system presents a list of cities in GUI 1110 (1020) which, as mentioned above, includes only cities which have a street corresponding to the street name selected in GUI 1106. Because the number of cities having a particular street name is likely to be much smaller than the number of cities represented in the map database, the user can more easily identify the correct choice via process of elimination. For example, if only two options, Los Angeles and San Francisco, are presented and the user knows that the street is not in Southern California, San Francisco is identified as the obvious choice. Once the user has selected the city (1022), the system presents GUI 1112 (1024) which allows the user to select the intersecting street from a list of streets which only includes streets which intersect with the first selected street name in the selected city. Once the intersecting street is entered (1025), the system designates it as the destination and begins route calculation (1026).

Figure 11A:
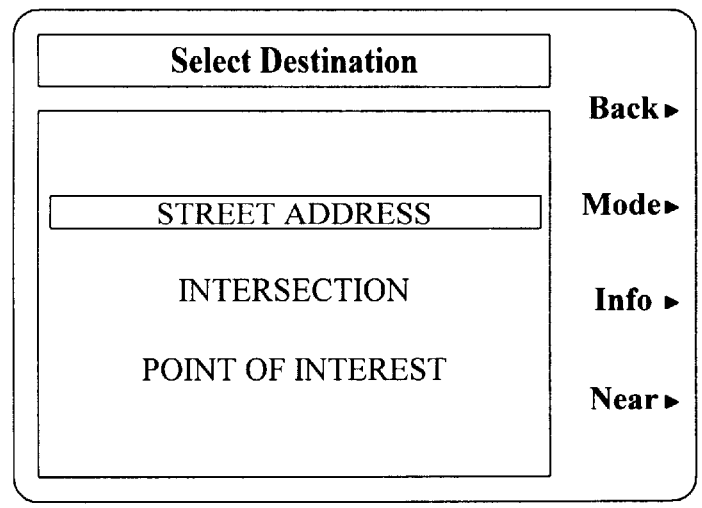
FIGS. 11a–11j are a series of GUI screens illustrating selection of a destination for route calculation according to a specific embodiment of the invention.
Figure 11B:
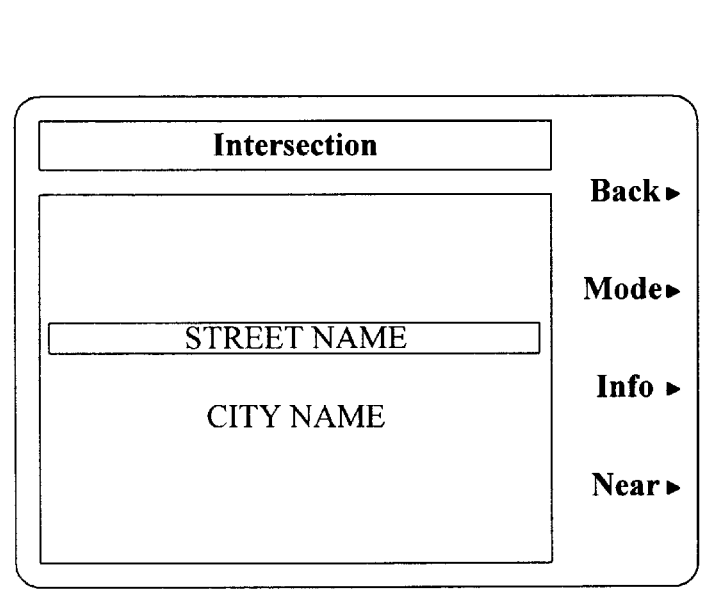
Figure 11C:
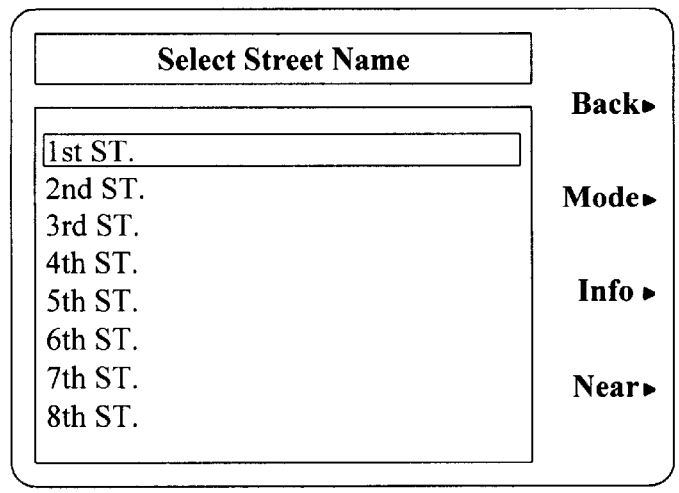
Figure 11D:
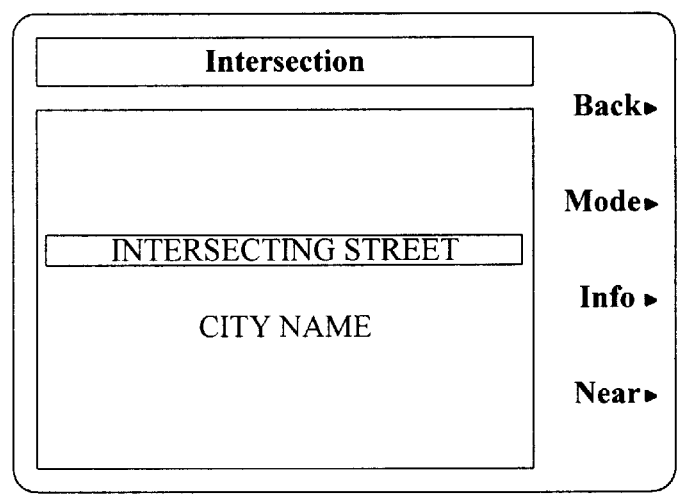
Figure 11E:
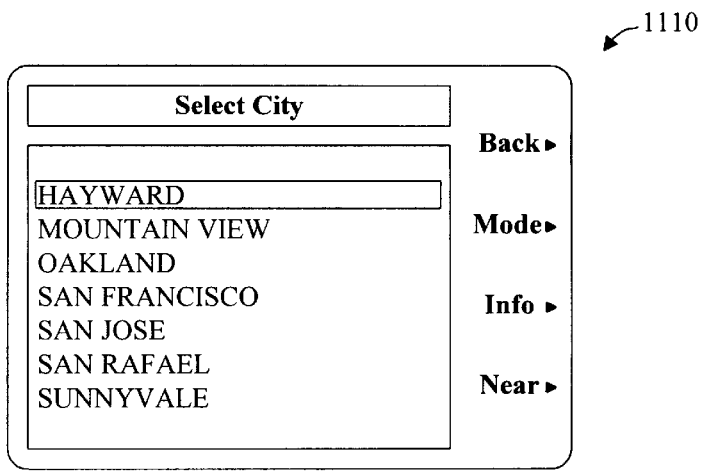
Figure 11F:
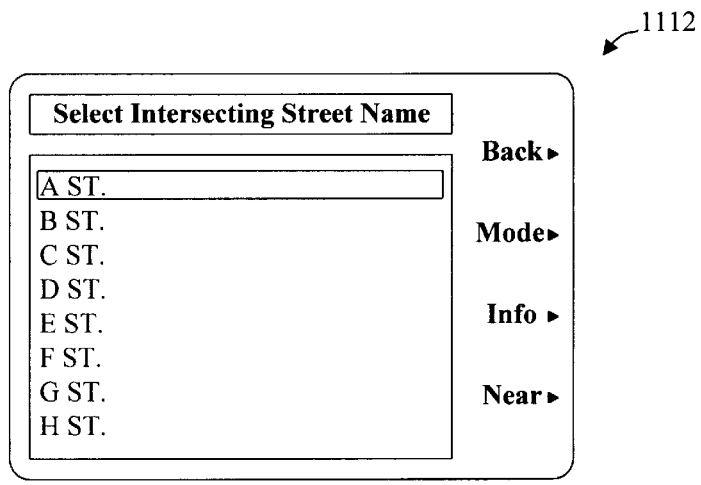
Figure 11G:
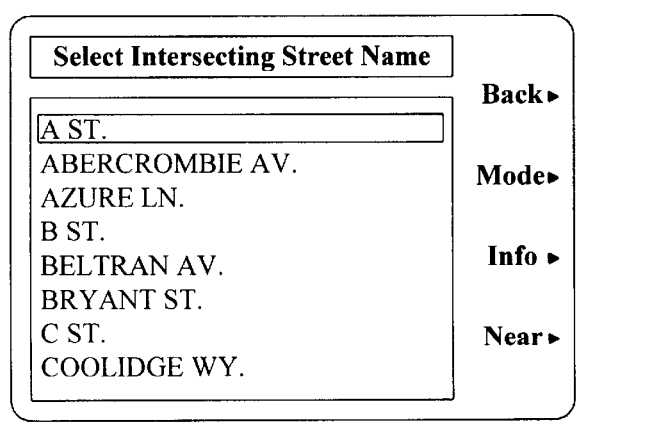
Figure 11H:
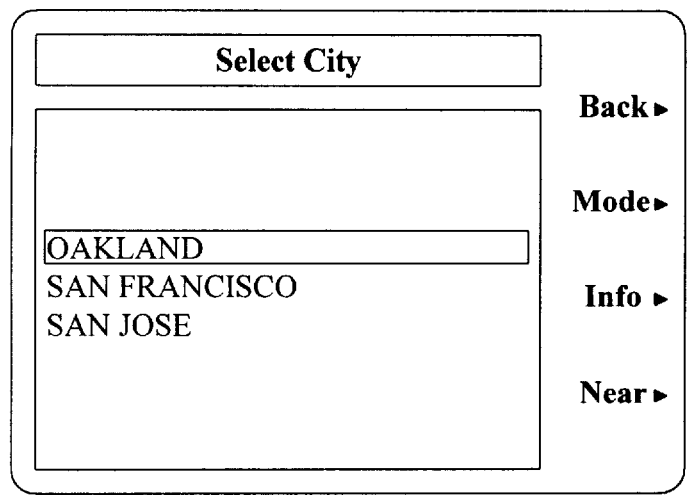
Figure 11I:
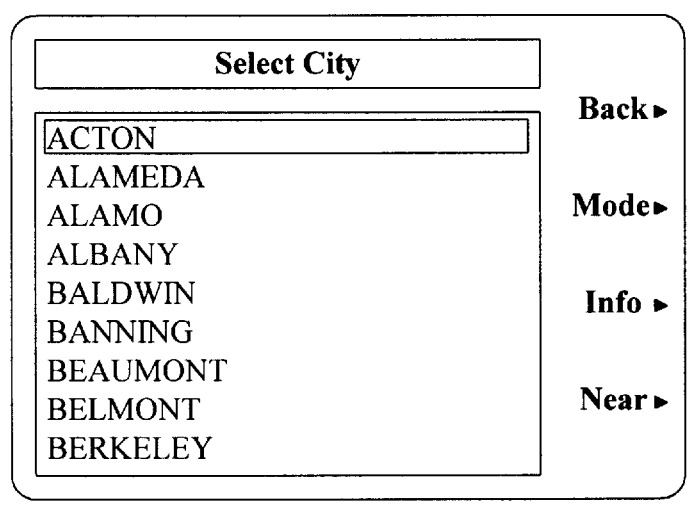
Figure 11J:
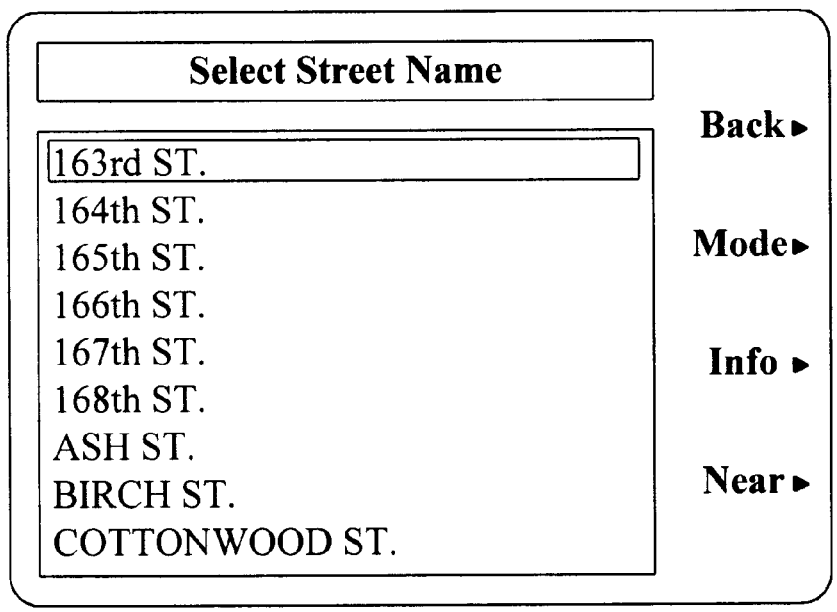

If on the other hand, in GUI 1108 the user elects to enter the intersecting street before designation of the city, the system presents GUI 1113 (1028) which comprises a list of all street names in the map database which intersect with the first selected street without regard to city. Then, when the user has selected the intersecting street (1029), the system presents a list of cities in GUI 1114 (1030). According to a specific embodiment (not shown), the city list in GUI 1114 is the same as that displayed in GUI 1110. That is, it only contains cities having the first selected street. According to another embodiment, and as shown in FIG. 11h, the city list in GUI 1114 is further restricted to only include cities having both selected streets. Upon selection of the city (1032), the system designates the intersection as the destination and begins route calculation (1026).

If at GUI 1104, the user knows which city the intersection is in and elects to begin the selection process by designating the city rather than a street (1010), the system presents a city list in GUI 116 which includes all of the cities covered by the map database (1036). In response to selection of a city (1038), the system presents a list of street names in GUI 1118 which correspond to the selected city (1040). That is, only street names corresponding to streets in the selected city are presented. In response to selection of a street name in GUI 1118 (1042), the system presents GUI 1112 to facilitate selection of the intersecting street name (1044). As described above with reference to step 1024, the street name list in GUI 1112 includes only street names for streets which intersect with the first selected street name in the selected city. Once the street intersection is entered (1046), the system designates the intersection as the destination and begins route calculation (1026).

It will be understood that various ones of the GUIs of FIGS. 11a–11j may incorporate the features of and operate as described above with reference to FIGS. 2–6d. For example, GUIs 1106, and 1110–1118 may employ the scrolling techniques described above to select an entry from the displayed list.

Figure 12:
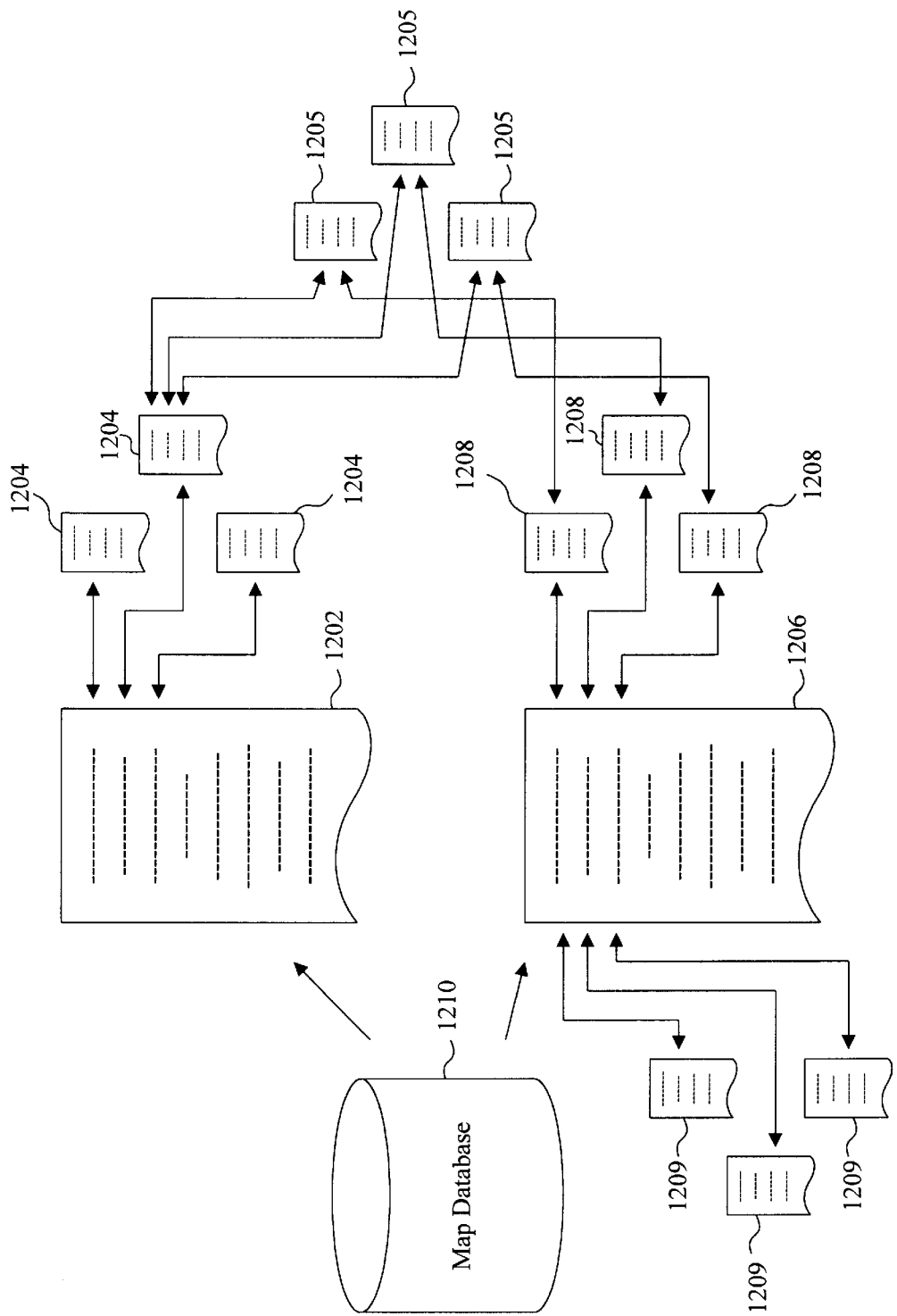
FIG. 12 illustrates the relationship between data tables in the memory of the vehicle navigation system of the present invention.

FIG. 12 shows data tables 1202–1209 in system memory which are derived from the data in map database 1210. Data tables 1202–1209 correspond to various ones of the GUI screens of FIGS. 11a–11j. For example, data table 1202 corresponds to the city list presented in GUI 1116. That is, data table 1202 contains entries for all of the cities covered by map database 1210. For each entry in data table 1202 there is a corresponding street name data table 1204 which contains entries for streets in the corresponding city. The street name list in GUI 1118 corresponds to one of street name data tables 1204. In addition, for each entry in each street name data table 1204 there is an intersecting street name data table 1205 which contains entries for all streets intersecting with the corresponding entry in table 1204 in the corresponding city in data table 1202. The intersecting street name list in GUI 1112 corresponds to one of the intersecting street name tables 1205.

There is also a street name table 1206 in system memory which contains entries for all streets represented in database 1210. Data table 1206 corresponds to the street name list presented in GUI 1106. For each entry in data table 1206 there is a corresponding data table 1208 which contains entries for cities which have streets corresponding to the street name. The city list in GUI 1110 corresponds to one of city tables 1208. It will be understood that, as shown in FIG. 12, each entry in each city table 1208 corresponds to one of intersecting street name tables 1205, i.e., the table 1205 corresponding to the same combination of street and city name from tables 1202 and 1204. In addition, for each entry in data table 1206 there is also a corresponding data table 1209 which contains entries for all streets in database 1210 which intersect with the corresponding city in table 1208. The intersecting street name list in GUI 1113 corresponds to one of data tables 1209.

While the invention has been particularly shown and described with reference to specific embodiments thereof, it will be understood by those skilled in the art that changes in the form and details of the disclosed embodiments may be made without departing from the spirit or scope of the invention. For example, embodiments have been described herein with reference to selection of a city from a city list in a vehicle navigation system. It will be understood, however, that the methods, apparatus, and GUIs described herein may be used in a wide variety of systems to make a selection from any alphanumerically organized list of entries. For example, with reference to vehicle navigation systems, the list from which a selection is made may be a list of streets, points of interest, geographic regions, or states. Alternatively, with reference to a computer file system, the list from which a selection is made may be a list of files.

Moreover, the arrangements of objects in the GUIs described herein are merely exemplary. The basic elements of the GUI of the present invention may be placed in a wide variety of arrangements without departing from the scope of the invention. In addition, the characters in the selection window/character slot may be differentiated from those in the list window in many different ways beyond font size, color, or brightness without departing from the invention.

With respect to the techniques for selecting a destination described herein, it will be understood that the methods described may be applied to more than street address and intersection designations. For example, selection of a point of interest such as a museum or a restaurant may be effected using similar techniques. More generally, selection of any geographic location more specific than a city or a region may be effected according to these techniques. Therefore, the scope of the invention should be determined with reference to the appended claims.

What is claimed is:

1. A method for selecting an entry from a list of entries in a vehicle navigation system, the system having a display, an input device and a selection device, the method comprising:
   presenting first and second objects on the display, the first object comprising the list of entries, and the second object comprising a selection window comprising a character slot and a plurality of adjacent character spaces, the second object being operable to present a sequence of characters in the character slot and to enter one of the characters in each of the character spaces in response to manipulation of the input device;
   presenting an arrangement of the characters in the adjacent character spaces of the selection window and the character slot in response to manipulation of the input device;
   for each of the characters presented in the character slot, highlighting a first entry in the list of entries, the first entry corresponding to the arrangement of characters; and
   selecting a highlighted entry from the list of entries in response to a selection signal generated by actuation of the selection device.

2. The method of claim 1 wherein the vehicle navigation system further comprises a mode key, the method further comprising switching the vehicle navigation system between a first mode and a second mode in response to activation of the mode key, the input device being operable to manipulate the first object in the first mode and the second object in the second mode.

3. The method of claim 2 wherein an attribute of the second object is suppressed in the first mode and an attribute of the first object is suppressed in the second mode.

4. The method of claim 1 wherein the characters presented in the second object differ from the entries presented in the first object in at least one text attribute thereby highlighting the characters in the second object.

5. The method of claim 4 wherein the at least one text attribute comprises font size and the characters in the second object are characterized by a first font size which is larger than a second font size associated with the entries.

6. The method of claim 4 wherein the at least one text attribute comprises color.

7. The method of claim 4 wherein the at least one text attribute comprises brightness.

8. The method of claim 1 wherein the sequence of characters which may be presented in the character slot includes only characters in a corresponding character space in the entries in the list.

9. The method of claim 1 wherein highlighting the first entry occurs substantially simultaneously with presentation of one of the characters in the character slot.

10. The method of claim 1 wherein the list of entries comprises a list of cities.

11. The method of claim 1 wherein the list of entries comprises a list of streets.

12. The method of claim 1 wherein the list of entries comprises a list of points of interest.

13. The method of claim 1 wherein the list of entries comprises a list of geographic regions.

14. The method of claim 1 wherein the list of entries comprises a list of states.

15. The method of claim 1 wherein highlighting the first entry comprises presenting a first portion of the list of entries including the first entry in the second object.

16. The method of claim 1 wherein highlighting the first entry comprises altering the list of entries to include only entries corresponding to the arrangement of characters in the selection window.

17. The method of claim 1 wherein the character slot is separate from the selection window in the second object.

18. The method of claim 1 wherein the character slot comprises one of the adjacent spaces in the selection window as designated by a cursor.

19. A graphical user interface in the display of a vehicle navigation system, the system having an input device and a selection device, the graphic user interface comprising:
   a first object comprising a list of entries; and
   a second object comprising a character slot and selection window comprising a plurality of adjacent character spaces, the second object being operable to present a sequence of characters in the character slot and to enter one of the characters in each of the character spaces in response to manipulation of the input device;
   wherein, in response to an arrangement of the characters in the adjacent character spaces of the selection window and the character slot, a first entry is highlighted in the list of entries, the first entry corresponding to the arrangement of characters.

20. The graphical user interface of claim 19 wherein the vehicle navigation system further comprises a mode key activation of which switches the vehicle navigation system between a first mode and a second mode, the first object being responsive to the input device in the first mode, and the second object being responsive to the input device in the second mode.

21. The graphical user interface of claim 20 wherein an attribute of the second object is suppressed in the first mode and an attribute of the first object is suppressed in the second mode.

22. The graphical user interface of claim 19 wherein the characters presented in the second object differ from the entries presented in the first object in at least one text attribute thereby highlighting the characters in the second object.

23. The graphical user interface of claim 22 wherein the at least one text attribute comprises font size and the characters in the second object are characterized by a first font size which is larger than a second font size associated with the entries.

24. The graphical user interface of claim 22 wherein the at least one text attribute comprises color.

25. The graphical user interface of claim 22 wherein the at least one text attribute comprises brightness.

26. The graphical user interface of claim 19 wherein the sequence of characters which may be presented in the character slot includes only characters in a corresponding character space in the entries in the list.

27. The graphical user interface of claim 19 wherein highlighting of the first entry occurs substantially simultaneously with presentation of one of the characters in the character slot.

28. The graphical user interface of claim 19 wherein the list of entries comprises a list of cities.

29. The graphical user interface of claim 19 wherein the list of entries comprises a list of streets.

30. The graphical user interface of claim 19 wherein the list of entries comprises a list of points of interest.

31. The graphical user interface of claim 19 wherein the character slot is separate from the selection window in the second object.

32. The graphical user interface of claim 19 wherein the character slot comprises one of the adjacent spaces in the selection window as designated by a cursor.

33. A vehicle navigation system, comprising:
a display;
an input device;
a selection device; and
a processor coupled to the display, input device and selection device, the processor being operable to:
present first and second objects on the display, the first object comprising a list of entries, and the second object comprising a character slot and a selection window comprising a plurality of adjacent character spaces, the second object being operable to present a sequence of characters in the character slot and to enter one of the characters in each of the character spaces in response to manipulation of the input device;
present an arrangement of the characters in the adjacent character spaces of the selection window and the character slot in response to manipulation of the input device;
for each of the characters presented in the character slot, highlight a first entry in the list of entries, the first entry corresponding to the arrangement of characters; and
select a highlighted entry from the list of entries in response to a selection signal generated by actuation of the selection device.

34. A computer program product for selecting an entry from a list of entries in a vehicle navigation system, the system having a display, an input device and a selection device, comprising:
at least one computer-readable medium; and
a computer program mechanism embedded in the at least one computer-readable medium for causing a computer to perform the steps of:
presenting first and second objects on the display, the first object comprising the list of entries, and the second object comprising a character slot and a selection window comprising a plurality of adjacent character spaces, the second object being operable to present a sequence of characters in the character slot and to enter one of the characters in each of the character spaces in response to manipulation of the input device;
presenting an arrangement of the characters in the adjacent character spaces of the selection window and the character slot in response to manipulation of the input device;
for each of the characters presented in the character slot, highlighting a first entry in the list of entries, the first entry corresponding to the arrangement of characters; and
selecting a highlighted entry from the list of entries in response to a selection signal generated by actuation of the selection device.

35. A method for selecting a destination using a street address in a vehicle navigation system having a user interface, the method comprising:
in response to selection of a street name by a user via the user interface, presenting a first city option and an address option to the user via the user interface;
where the first city option is selected by the user:
presenting a first list of city names to the user via the user interface;
in response to selection of a first city name from the first list by the user, facilitating selection of the street address by the user via the user interface; and
in response to selection of the street address by the user, designating the street address as the destination; and
where the address option is selected by the user:
facilitating selection of the street address by the user via the user interface;
in response to selection of the street address by the user, presenting a second list of city names to the user via the user interface; and
in response to selection of the first city name from the second list by the user, designating the street address as the destination.

36. The method of claim 35 wherein the second list of city names includes only entries corresponding to cities including the street address.

37. The method of claim 35 wherein the first list of city names includes only entries corresponding to cities including a street corresponding to the street name.

38. The method of claim 35 wherein the user interface includes a display, and presenting the first city and address options comprises presenting a graphical user interface comprising representations of the first city and address options.

39. The method of claim 35 wherein the user interface includes a display, and presenting the first and second city lists comprises presenting graphical user interfaces comprising representations of the first and second city lists.

40. The method of claim 35 wherein the user interface includes a display, and facilitating selection of the street address comprises presenting a graphical user interface with which the user may input the street address.

41. The method of claim 35 further comprising:
prior to selection of the street name by the user, presenting a street name option and a second city option to the user via the user interface;
where the street name option is selected by the user, facilitating selection of the street name by the user via the user interface; and where the second city option is selected by the user:
  presenting a third list of city names to the user via the user interface;
  in response to selection of the first city name from the third list by the user, presenting a list of street names including the street name;
  in response to selection of the street name from the list of street names, facilitating selection of the street address by the user via the user interface; and
  in response to selection of the street address by the user, designating the street address as the destination.

42. The method of claim 41 wherein the vehicle navigation system further comprises a map database, and the third list of city names includes entries for all cities in the map database.

43. The method of claim 41 wherein the user interface includes a display, and presenting the street name and second city options comprises presenting a graphical user interface comprising representations of the street name and second city options.

44. The method of claim 41 wherein the user interface includes a display, and presenting the third city list comprises presenting a graphical user interface comprising a representation of the third city list.

45. The method of claim 41 wherein the user interface includes a display, and presenting the list of street names comprises presenting a graphical user interface comprising a representation of the list of street names.

46. The method of claim 41 wherein the user interface includes a display, and facilitating selection of the street name comprises presenting a graphical user interface with which the user may input at least a portion of the street name.

47. The method of claim 41 wherein the user interface includes a display, and facilitating selection of the street address comprises presenting a graphical user interface with which the user may input the street address.

48. A vehicle navigation system, comprising:
  a user interface; and
  a processor coupled to the user interface, the processor being operable to:
    in response to selection of a street name by a user via the user interface, present a first city option and an address option to the user via the user interface;
  where the first city option is selected by the user:
    present a first list of city names to the user via the user interface;
    in response to selection of a first city name from the first list by the user, facilitate selection of the street address by the user via the user interface; and
    in response to selection of the street address by the user, designate the street address as the destination; and
  where the address option is selected by the user:
    facilitate selection of the street address by the user via the user interface;
    in response to selection of the street address by the user, present a second list of city names to the user via the user interface; and
    in response to selection of the first city name from the second list by the user, designate the street address as the destination.

49. A vehicle navigation system, comprising:
  a user interface;
  means for presenting a first city option and an address option to a user via the user interface in response to selection of a street name by the user via the user interface;
  where the first city option is selected by the user:
    means for presenting a first list of city names to the user via the user interface;
    means for facilitating selection of the street address by the user via the user interface in response to selection of a first city name from the first list by the user; and
    means for designating the street address as the destination in response to selection of the street address by the user; and
  where the address option is selected by the user:
    means for facilitating selection of the street address by the user via the user interface;
    means for presenting a second list of city names to the user via the user interface in response to selection of the street address by the user; and
    means for designating the street address as the destination in response to selection of the first city name from the second list by the user.

50. A computer program product for selecting a destination using a street address in a vehicle navigation system having a user interface, comprising:
  at least one computer-readable medium; and
  a computer program mechanism embedded in the at least one computer-readable medium for causing a computer to perform the steps of:
    in response to selection of a street name by a user via the user interface, presenting a first city option and an address option to the user via the user interface;
  where the first city option is selected by the user:
    presenting a first list of city names to the user via the user interface;
    in response to selection of a first city name from the first list by the user, facilitating selection of the street address by the user via the user interface; and
    in response to selection of the street address by the user, designating the street address as the destination; and
  where the address option is selected by the user:
    facilitating selection of the street address by the user via the user interface;
    in response to selection of the street address by the user, presenting a second list of city names to the user via the user interface; and
    in response to selection of the first city name from the second list by the user, designating the street address as the destination.

51. A plurality of interrelated data tables in a memory in a vehicle navigation system, the vehicle navigation system having a map database comprising a plurality of street names and a plurality of city names, the plurality of data tables comprising:
  a first city name table comprising the plurality of city names from the map database;
  associated with each of the city names, an associated street name table comprising at least one street name in the map database corresponding to the associated city;
  a first street name table comprising the plurality of street names from the map database; and
  associated with each of the street names, an associated city name table comprising at least one city name in the map database corresponding to a city in which a street corresponding to the associated street name exists.

52. The plurality of interrelated data tables of claim 51 further comprising, associated with each of the street names an intersecting street name table comprising at least one intersecting street name corresponding to a street which intersects with the associated street name.

53. The plurality of interrelated data tables of claim 51 further comprising, associated with selected combinations of street names and city names an intersecting street name table comprising at least one intersecting street name corresponding to a street which intersects with the associated street name and corresponds to the city name.

54. A method for selecting a destination using a street intersection in a vehicle navigation system having a user interface, the method comprising:
  in response to selection of a street name by a user via the user interface, presenting a first city option and an intersection option to the user via the user interface;
  where the first city option is selected by the user:
    presenting a first list of city names to the user via the user interface;
    in response to selection of a first city name from the first list by the user, facilitating selection of the street intersection by the user via the user interface; and
    in response to selection of the street intersection by the user, designating the street intersection as the destination; and
  where the intersection option is selected by the user:
    facilitating selection of the street intersection by the user via the user interface;
    in response to selection of the street intersection by the user, presenting a second list of city names to the user via the user interface; and
    in response to selection of the first city name from the second list by the user, designating the street intersection as the destination.

55. The method of claim 54 wherein the second list of city names includes only entries corresponding to cities including the street intersection.

56. The method of claim 54 wherein the first list of city names includes only entries corresponding to cities including a street corresponding to the street name.

57. The method of claim 54 wherein the user interface includes a display, and presenting the first city and intersection options comprises presenting a graphical user interface comprising representations of the first city and intersection options.

58. The method of claim 54 wherein the user interface includes a display, and presenting the first and second city lists comprises presenting graphical user interfaces comprising representations of the first and second city lists.

59. The method of claim 54 wherein the user interface includes a display, and facilitating selection of the street intersection comprises presenting a graphical user interface with which the user may select an intersecting street.

60. The method of claim 54 further comprising:
  prior to selection of the street name by the user, presenting a street name option and a second city option to the user via the user interface;
  where the street name option is selected by the user, facilitating selection of the street name by the user via the user interface; and
  where the second city option is selected by the user:
    presenting a third list of city names to the user via the user interface;
    in response to selection of the first city name from the third list by the user, presenting a list of street names including the street name;
    in response to selection of the street name from the list of street names, facilitating selection of the street intersection by the user via the user interface; and
    in response to selection of the street intersection by the user, designating the street address as the destination.

61. The method of claim 60 wherein the vehicle navigation system further comprises a map database, and the third list of city names includes entries for all cities in the map database.

62. The method of claim 60 wherein the user interface includes a display, and presenting the street name and second city options comprises presenting a graphical user interface comprising representations of the street name and second city options.

63. The method of claim 60 wherein the user interface includes a display, and presenting the third city list comprises presenting a graphical user interface comprising a representation of the third city list.

64. The method of claim 60 wherein the user interface includes a display, and presenting the list of street names comprises presenting a graphical user interface comprising a representation of the list of street names.

65. The method of claim 60 wherein the user interface includes a display, and facilitating selection of the street name comprises presenting a graphical user interface with which the user may input at least a portion of the street name.

66. The method of claim 60 wherein the user interface includes a display, and facilitating selection of the street intersection comprises presenting a graphical user interface with which the user may select the street intersection.

67. A vehicle navigation system, comprising:
  a user interface; and
  a processor coupled to the user interface, the processor being operable to:
    in response to selection of a street name by a user via the user interface, present a first city option and an intersection option to the user via the user interface;
  where the first city option is selected by the user:
    present a first list of city names to the user via the user interface;
    in response to selection of a first city name from the first list by the user, facilitate selection of the street intersection by the user via the user interface; and
    in response to selection of the street intersection by the user, designate the street intersection as the destination; and
  where the intersection option is selected by the user:
    facilitate selection of the street intersection by the user via the user interface;
    in response to selection of the street intersection by the user, present a second list of city names to the user via the user interface; and
    in response to selection of the first city name from the second list by the user, designate the street intersection as the destination.

68. A vehicle navigation system, comprising:
  a user interface;
  means for presenting a first city option and an intersection option to a user via the user interface in response to selection of a street name by the user via the user interface;
  where the first city option is selected by the user:
    means for presenting a first list of city names to the user via the user interface;
    means for facilitating selection of the street intersection by the user via the user interface in response to selection of a first city name from the first list by the user; and
    means for designating the street intersection as the destination in response to selection of the street intersection by the user; and where the intersection option is selected by the user:
- means for facilitating selection of the street intersection by the user via the user interface;
- means for presenting a second list of city names to the user via the user interface in response to selection of the street intersection by the user; and
- means for designating the street intersection as the destination in response to selection of the first city name from the second list by the user.

69. A computer program product for selecting a destination using a street intersection in a vehicle navigation system having a user interface, comprising:
- at least one computer-readable medium; and
- a computer program mechanism embedded in the at least one computer-readable medium for causing a computer to perform the steps of:
  - in response to selection of a street name by a user via the user interface, presenting a first city option and an intersection option to the user via the user interface;
  - where the first city option is selected by the user:
    - presenting a first list of city names to the user via the user interface;
    - in response to selection of a first city name from the first list by the user, facilitating selection of the street intersection by the user via the user interface; and
    - in response to selection of the street intersection by the user, designating the street intersection as the destination; and
  - where the intersection option is selected by the user:
    - facilitating selection of the street intersection by the user via the user interface;
    - in response to selection of the street intersection by the user, presenting a second list of city names to the user via the user interface; and
    - in response to selection of the first city name from the second list by the user, designating the street intersection as the destination.

70. A method for selecting a destination in a vehicle navigation system having a user interface, the method comprising:
- presenting a city option and a geographic location option to the user via the user interface;
- where the city option is selected by the user:
  - presenting a first list of city names to the user via the user interface;
  - in response to selection of a first city name from the first list by the user, facilitating selection of the geographic location by the user via the user interface; and
  - in response to selection of the geographic location by the user, designating the geographic location as the destination; and
- where the geographic location option is selected by the user:
  - facilitating selection of the geographic location by the user via the user interface;
  - in response to selection of the geographic location by the user, presenting a second list of city names to the user via the user interface; and
  - in response to selection of the first city name from the second list by the user, designating the geographic location as the destination.

* * * * *